US012737325B2

(12) United States Patent
Sheppard et al.

(10) Patent No.: US 12,737,325 B2
(45) Date of Patent: Sep. 15, 2026

(54) METHODS AND APPARATUS TO ESTIMATE AUDIENCE MEASUREMENT METRICS BASED ON USERS REPRESENTED IN BLOOM FILTER ARRAYS

(71) Applicant: The Nielsen Company (US), LLC, New York, NY (US)

(72) Inventors: Michael Sheppard, Holland, MI (US); Jake Ryan Dailey, San Francisco, CA (US); Dongbo Cui, New York, NY (US); Jonathan Sullivan, Hurricane, UT (US); Diane Morovati Lopez, West Hills, CA (US); Christie Nicole Summers, Baltimore, MD (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 169 days.

(21) Appl. No.: 18/355,517

(22) Filed: Jul. 20, 2023

(65) Prior Publication Data

US 2023/0359594 A1 Nov. 9, 2023

Related U.S. Application Data

(63) Continuation of application No. 16/945,055, filed on Jul. 31, 2020, now Pat. No. 11,755,545.

(51) Int. Cl.
*G06F 16/20* (2019.01)
*G06F 16/435* (2019.01)

(52) U.S. Cl.
CPC ............ *G06F 16/20* (2019.01); *G06F 16/435* (2019.01)

(58) Field of Classification Search
CPC ......... G06F 16/20; G06F 16/435; G06N 7/01; G06N 20/20; H04L 43/10; H04N 21/252;
(Continued)

(56) References Cited

U.S. PATENT DOCUMENTS 9,208,471 B2 * 12/2015 Cross ..................... G06Q 10/10
9,361,322 B1 * 6/2016 Dutta .................... G06F 16/435
(Continued)

FOREIGN PATENT DOCUMENTS

WO WO-2011115945 A1 * 9/2011 ............. H04H 60/58
WO WO-2013109524 A1 * 7/2013 ......... G06Q 30/0201

OTHER PUBLICATIONS

Hilda "On The Probability Theory Of Arbitrarily Linked Events", Dec. 1938, Institute of Mathematical Statistics, Dec. 1938, 12 pages. (Year: 1938).*
(Continued)

*Primary Examiner* — Romain Jeanty

(57) ABSTRACT

Methods and systems to estimate audience measurement metrics based on users represented in Bloom filter arrays are disclosed. An apparatus includes a communications interface to receive a first Bloom filter array from a first computer of a first database proprietor. The first Bloom filter array is representative of first users who accessed media. The first users are registered with the first database proprietor. The first Bloom filter array includes a first array of first elements. Values of respective ones of the first elements are either a 0 or a 1 based on whether quantities of the first users allocated to the respective ones of the first elements are even or odd. The apparatus further includes a Bloom filter array analyzer to estimate a first cardinality for the first Bloom filter array. The first cardinality is indicative of a total number of the first users who accessed the media.

17 Claims, 9 Drawing Sheets

(58) Field of Classification Search
CPC ........... H04N 21/254; H04N 21/44224; G06Q 30/0204
USPC ........................................................ 705/3–44
See application file for complete search history.

(56) References Cited

U.S. PATENT DOCUMENTS

| | | | | |
|---|---|---|---|---|
| 11,216,588 | B1 * | 1/2022 | An | G06F 21/6227 |
| 2009/0158309 | A1 * | 6/2009 | Moon | G06V 20/53 725/12 |
| 2010/0070514 | A1 * | 3/2010 | Woodruff | G06F 16/10 707/754 |
| 2010/0191631 | A1 * | 7/2010 | Weidmann | G06F 3/013 348/E7.086 |
| 2014/0149433 | A1 * | 5/2014 | Lakshminarayan | G06F 16/335 707/750 |
| 2014/0237496 | A1 * | 8/2014 | Julian | G06Q 30/02 725/13 |
| 2016/0196567 | A1 * | 7/2016 | Singh | G06Q 30/0224 705/7.33 |
| 2018/0349364 | A1 * | 12/2018 | Arnold | G06F 16/901 |
| 2019/0026221 | A1 * | 1/2019 | Bar-Joshua | G11C 11/5642 |

OTHER PUBLICATIONS

Elaine “Reconfiguring Audience Measurement in Platform Ecologies of Video Streaming: iQiyi’s Pivot Toward Data-Driven Fandom and Algorithmic Metrics”, International Journal of Communication 15(2021), pp. 1-22 (Year: 2021).*

* cited by examiner

METHODS AND APPARATUS TO ESTIMATE AUDIENCE MEASUREMENT METRICS BASED ON USERS REPRESENTED IN BLOOM FILTER ARRAYS

CROSS-REFERENCE TO RELATED APPLICATIONS

The present disclosure is a continuation of U.S. patent application Ser. No. 16/945,055 (now U.S. Pat. No. 11,755,545), filed Jul. 31, 2020, which is hereby incorporated by reference in its entirety.

FIELD OF THE DISCLOSURE

This disclosure relates generally to monitoring audiences, and, more particularly, to methods and apparatus to estimate audience measurement metrics based on users represented in Bloom filter arrays.

BACKGROUND

Traditionally, audience measurement entities determine audience exposure to media based on registered panel members. That is, an audience measurement entity (AME) enrolls people who consent to being monitored into a panel. The AME then monitors those panel members to determine media (e.g., television programs or radio programs, movies, DVDs, advertisements, webpages, streaming media, etc.) exposed to those panel members. In this manner, the AME can determine exposure metrics (e.g., audience size) for different media based on the collected media measurement data.

As people are accessing more and more media through digital means (e.g., via the Internet), it is possible for online publishers and/or database proprietors providing such media to track all instances of exposure to media (e.g., on a census wide level) rather than being limited to exposure metrics based on audience members enrolled panel members of an AME. However, database proprietors are typically only able to track media exposure pertaining to online activity associated with the platforms operated by the database proprietors. Where media is delivered via multiple different platforms of multiple different database proprietors, no single database proprietor will be able to provide exposure metrics across the entire population to which the media was made accessible. Furthermore, such database proprietors have an interest in preserving the privacy of their users such that there are limitations on the nature of the exposure metrics such database proprietors are willing to share with one another and/or an interested third party such as an AME.

Figure 1:
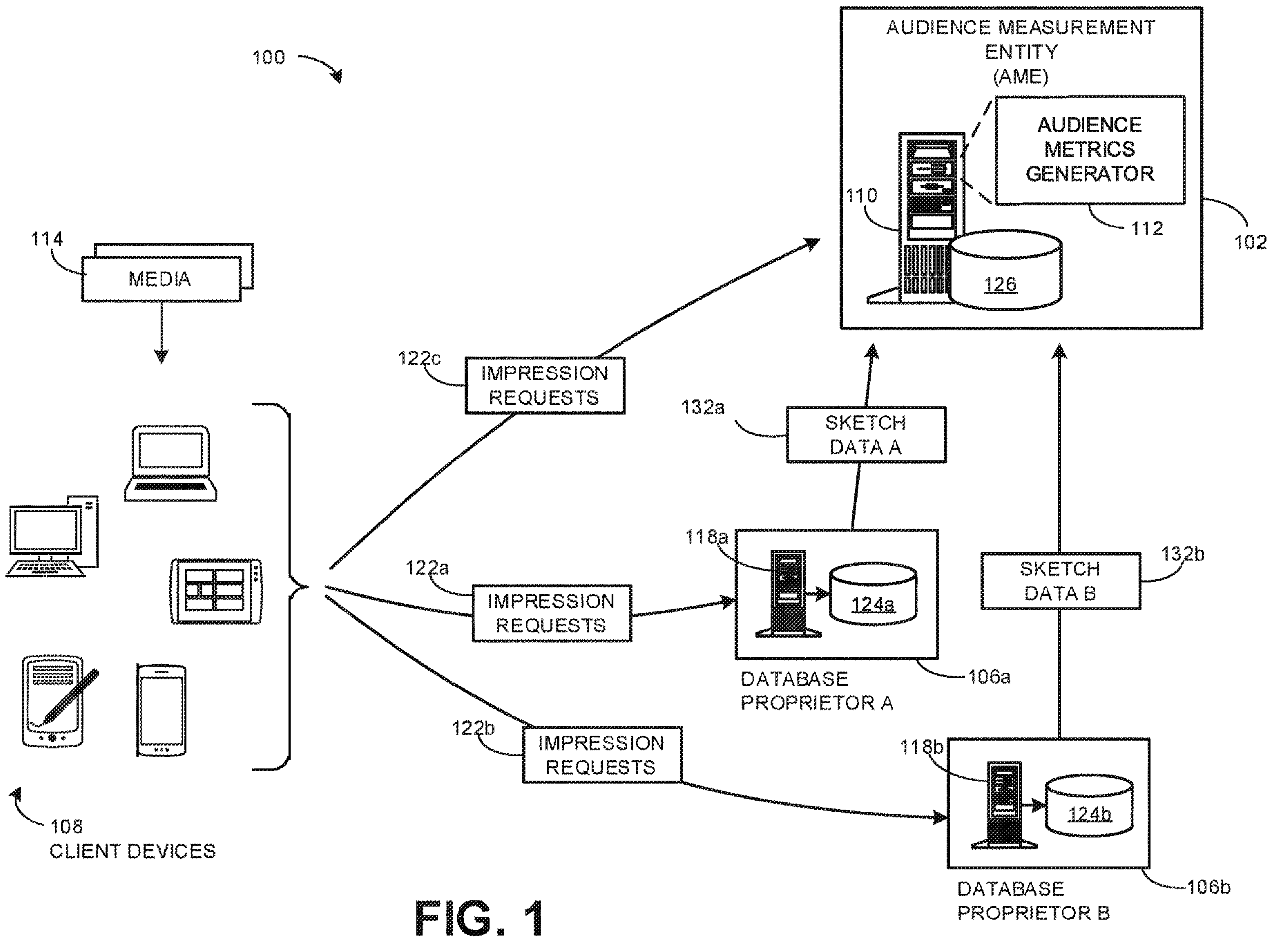
FIG. 1 is an example environment to implement a technique for logging impressions of accesses to server-based media.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors, custom date ranges, custom combinations of assets and platforms, etc. Some deduplication techniques perform deduplication across database proprietors using particular systems (e.g., Nielsen's TV Panel Audience Link). For example, such deduplication techniques match or probabilistically link personally identifiable information (PII) from each source. Such deduplication techniques require storing massive amounts of user data or calculating audience overlap for all possible combinations, neither of which are desirable. PII data can be used to represent and/or access audience demographics (e.g., geographic locations, ages, genders, etc.).

In some situations, while the database proprietors may be interested in collaborating with an AME, the database proprietor may not want to share the PII data associated with its subscribers to maintain the privacy of the subscribers. One solution to the concerns for privacy is to share sketch data that provides summary information about an underlying dataset without revealing PII data for individuals that may be included in the dataset. Not only does sketch data assist in protecting the privacy of users represented by the data, sketch data also serves as a memory saving construct to represent the contents of relatively large databases using relatively small amounts of date. Further, not only does the relatively small size of sketch date offer advantages for memory capacity but it also reduces demands on processor capacity to analyze and/or process such data.

Sketch data may include a cardinality defining the number of individuals represented by the data (e.g., subscribers) while maintaining the identity of such individuals private. The cardinality of sketch data associated with media exposure is a useful piece of information for an AME because it provides an indication of the number of audience members exposed to particular media via a platform maintained by the database proprietor providing the sketch data. However, in some instances, sketch data may be provided by database proprietors without providing an indication of the cardinality of the data. Even when the cardinality for sketch data is provided, problems for audience metrics arise when the media may be accessed via multiple different database proprietors that each provide separate sketch data summarizing the individual subscribers that were exposed to the media. In particular, the sum of the cardinalities of each sketch data is not a reliable estimate of the unique audience size because the same individual may be represented in multiple datasets associated with different sketch data. As a result, such individuals will be double counted (or possible more than twice if there are more than two datasets being aggregated) resulting in the incorrect inflation of the unique audience size. Furthermore, identifying overlap between two different sets of sketch data is non-trivial because, as stated above, the sketch data is generated to preserve the identity and privacy of the individuals represented thereby. Examples disclosed herein overcome the above challenges by enabling the estimation of a total cardinality of users represented in sketch data associated with two or more different datasets so that an AME may be able to deduplicate individuals represented in more than one of the datasets, thereby enabling the accurate estimate of the unique audience for a particular media item. Furthermore, the cardinality estimation in examples disclosed herein may be made with or without database proprietors providing the dataset-specific cardinalities associated with the different data sketches being combined.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets (e.g., sketch data) is generated.

Although examples disclosed herein are described in association with audience metrics related to media impressions, examples disclosed herein may be similarly used for other applications to deduplicate between multiple different datasets while preserving privacy. The datasets themselves need not be audiences or email addresses. They could be, for example, bank accounts, lists of purchased items, store visits, traffic patterns, etc. The datasets could be represented as lists of numbers or any other information represented as unique entries in a database.

FIG. 1 shows an example environment 100 that includes an example audience measurement entity (AME) 102, an example database proprietor A 106*a*, an example database proprietor B 106*b*, and example client devices 108. The example AME 102 includes an example AME computer 110 that implements an example audience metrics generator 112 to determine audience sizes based on media impressions logged by the database proprietors 106*a-b*. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, smart televisions, and/or any other type of device that may be connected to the Internet and capable of accessing and/or presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietors 106*a-b*. For example, the database proprietors 106*a-b* include corresponding database proprietor servers 118*a-b* that can serve media 114 to their corresponding subscribers via the client devices 108. Examples disclosed herein can be used to generate audience metrics data that measures audience sizes of media served by different ones of the database proprietors 106*a-b*. For example, the database proprietors 106*a-b* may use such audience metrics data to promote their online media serving services (e.g., ad server services, media server services, etc.) to prospective clients. By showing audience metrics data indicative of audience sizes drawn by corresponding ones of the database proprietors 106*a-b*, the database proprietors 106*a-b* can sell their media serving services to customers interested in delivering online media to users.

In some examples, the media 114 is presented via the client devices 108. When the media 114 is accessed by the client devices 108, the client devices 108 send impression requests 122*a-b* to the database proprietor servers 118*a-b* to inform the database proprietor servers 118*a-b* of the media accesses. In this manner, the database proprietor servers 118*a-b* can log media impressions in impression records of corresponding database proprietor audience metrics databases 124*a-b*. In some examples, when a database proprietor server 118*a-b* serves the media 114, the impression request 122*a-b* includes a first-party cookie set by that database proprietor server 118*a-b* so that the database proprietor server 118*a-b* can log an impression for the media 114 without using a third-party cookie. In some examples, the client devices 108 also send impression requests 122*c* to the AME 102 so that the AME 102 can log census impressions in an AME audience metrics database 126. In the illustrated example of FIG. 1, the database proprietors 106*a-b* log demographic impressions corresponding to accesses by the client devices 108 to the media 114. Demographic impressions are impressions logged in association with demographic information collected by the database proprietors 106*a-b* from registered subscribers of their services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the census impressions include some media impressions accessed via a platform maintained by the database proprietor A 106*a* and some media impressions accessed via a platform maintained by the database proprietor B 106*b*. In some examples, the AME computer 110 does not collect impressions, and examples disclosed herein are based on audience data from impressions collected by the database proprietors 106*a-b*. For instance, the AME computer 110 may not collect impressions if the database proprietors 106*a-b* do not allow or support third-party cookies on their platforms.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and/or episode number. When the example media 114 includes advertisements, such advertisements may be content and/or advertisements. The advertisements may be individual, standalone ads and/or may be part of one or more ad campaigns. In some examples, the ads of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122*a-c* (e.g., also referred to as tag requests) to one or more specified servers of the AME 102, the database proprietor A 106*a*, and/or the database proprietor B 106*b*. As used herein, impression requests 122*a-c* are used by the client devices 108 to report occurrences of media impressions caused by the client devices accessing the media 114. In the illustrated example, the impression requests 122*a-b* include user-identifying information that the database proprietors 106*a-b* can use to identify the subscriber that accessed the media 114. For example, when a subscriber of the database proprietor A 106*a* logs into a server of the database proprietor A 106*a* via a client device 108, the database proprietor A 106*a* sets a database proprietor cookie on the client device 108 and maps that cookie to the subscriber's identity/account information at the database proprietor server 118*a*. In examples disclosed herein, subscriber identity and/or subscriber account information includes personally identifiable information (PII) such as full name, street address, residence city and state, telephone number, email address, age, date of birth, social security number, demographic information, and/or any other personal information provided by subscribers in exchange for services from the database proprietors 106*a-b*. By having such PII data mapped to database proprietor cookies, the database proprietor A 106*a* can subsequently identify the subscriber based on the database proprietor cookie to determine when that user accessed different media 114 and to log an impression in association with demographics and/or other PII data of that user. In the illustrated example of FIG. 1, the impression requests 122*a-b* include database proprietor cookies of the client devices 108 to inform the database proprietors 106*a-b* of the particular subscribers that accessed the media 114. In some examples, the AME 102 also sets AME cookies in the client devices 108 to identify users that are enrolled in a panel of the AME 102 such that the AME 102 collects PII data of people that agree to having their internet activities monitored by the AME 102.

The impression requests 122*a-c* may be implemented using HTTP requests. However, whereas HTTP requests are network communications that traditionally identify web pages or other resources to be downloaded, the impression requests 122*a-c* of the illustrated example are network communications that include audience measurement information (e.g., ad campaign identification, content identifier, and/or user identification information) as their payloads. The server (e.g., the AME computer 110 and/or the database proprietor servers 118*a-b*) to which the impression requests 122*a-c* are directed is programmed to log occurrences of impressions reported by the impression requests 122*a-c*. Further examples of monitoring instructions (e.g., beacon instructions) and uses thereof to collect impression data are disclosed in Mazumdar et al., U.S. Pat. No. 8,370,489, entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and cause the client device 108 to send one or more of the impression requests 122*a-c* to report the access to the media 114. In such examples, the data collector can obtain user identifiers and/or device identifiers stored in the client devices 108 and send them in the impression requests 122*a-c* to enable the database proprietors 106*a-b* and/or the AME 102 to log impressions. Further examples of using a collector in client devices to collect impression data are disclosed in Burbank et al., U.S. Pat. No. 8,930,701, entitled "Methods and Apparatus to Collect Distributed User Information for Media Impressions and Search Terms," and in Bosworth et al., U.S. Pat. No. 9,237,138, entitled "Methods and Apparatus to Collect Distributed User Information for Media Impressions and Search Terms," both of which are hereby incorporated herein by reference in their entireties.

In some examples, the database proprietor servers 118*a-b* may additionally or alternatively user server logs to log impressions based on requests for media 114 from the client devices 108. For example, when a user of a client device 108 provides a URL or selects an item of media for viewing, the client device 108 sends an HTTP request (e.g., the impression request 122*a-b*) to a database proprietor server 118, a-b that includes the first-party cookie and an identifier of the requested media. In response, the database proprietor server 118*a-b* serves the requested media to the client device 108 and logs an impression of the media as attributable to the client device 108.

Typically, the database(s) 124*a-b* maintained by the database proprietors 106*a-b* are implemented in a closed platform or walled garden so that untrusted third parties do not have access to the information stored in the database. Among other reasons, database systems implemented in this manner serve to maintain the privacy of the users registered with the database proprietors 106*a-b*. Maintaining the privacy of individuals represented within the databases of the database proprietors 106*a-b* is in some tension with the interests of third-party entities (e.g., media providers that may want to target particular individuals (and/or particular demographic segments of a population) with media (e.g., advertisements), and/or the AME 102 that may want to generate audience metrics based on tracked exposures to the media 114).

In the illustrated example, the database proprietors 106*a-b* collaborate with the AME 102 so that the AME 102 can operate as an independent party that measures and/or verifies audience measurement information pertaining to the media 114 accessed by the subscribers of the database proprietors 106*a-b*. However, the database proprietors 106*a-b* desire to do so while protecting the privacies of their subscribers by not sharing or revealing subscriber identities, subscriber information, and/or any other subscriber PII data to outside parties. In examples disclosed herein, to share impression data with the AME 102 without revealing subscriber identities, subscriber information, and/or any other subscriber PII data, the database proprietors 106*a-b* process their collected impression data to generate corresponding sketch data 132*a-b*.

As used herein, sketch data is an arrangement of data for use in massive data analyses. For example, operations and/or queries that are specified with respect to the explicit and/or very large subsets, can be processed instead in sketch space (e.g., quickly (but approximately) from the much smaller sketches representing the actual data). This enables processing each observed item of data (e.g., each logged media impression and/or audience member) quickly in order to create a summary of the current state of the actual data. In some examples, summary statistics or sketch data provide an indication of certain characteristics (e.g., number of impressions of a media item and/or audience reach of the media item) of data in a database without disclosing any personally identifiable information of individual users that may have contributed to the summary statistics.

One type of data structure that is useful to provide summary statistics (e.g., sketch data) in the context of tracking exposure to media is the Bloom filter array. A typical Bloom filter array is a vector or array of bits that are initialized to 0 and then populated by flipping individual ones of the bits from 0 to 1 based on the allocation or assignment of users (or other data entries) in a database (e.g., the databases 124*a-b* of the database proprietors 106*a-b* of FIG. 1) to respective ones of the bits in the Bloom filter array. The users (or other data entries) in a database that are represented in the Bloom filter array are identified as corresponding to summary statistics of interest (e.g., users that were exposed to a particular media item). That is, while it would be possible to generate a vector for sketch data of all subscribers of either one of the database proprietors 106*a-b*, in many instances, the subscribers included in particular sketch data 132*a-b* may be the subset of all subscribers that corresponds to audience members that accessed and/or were exposed to a particular media item 114 of interest.

Figure 2:
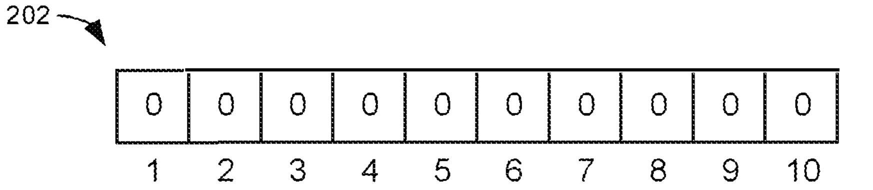
FIGS. 2-5 illustrate the creation of a traditional Bloom filter array.
Figure 3:
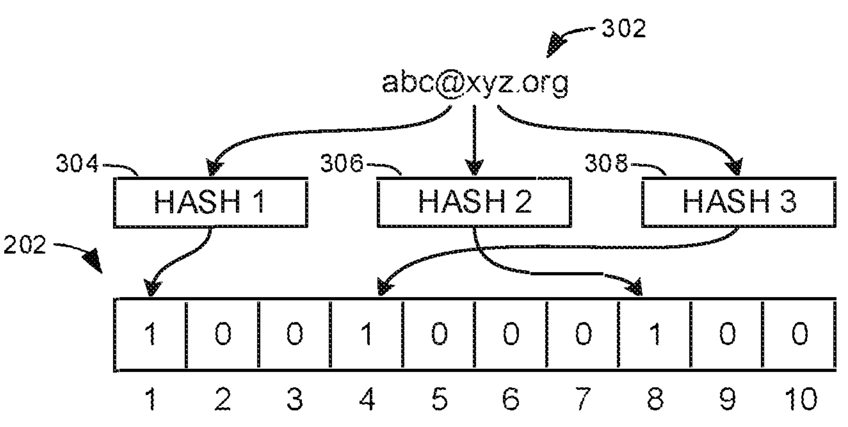
Figure 4:
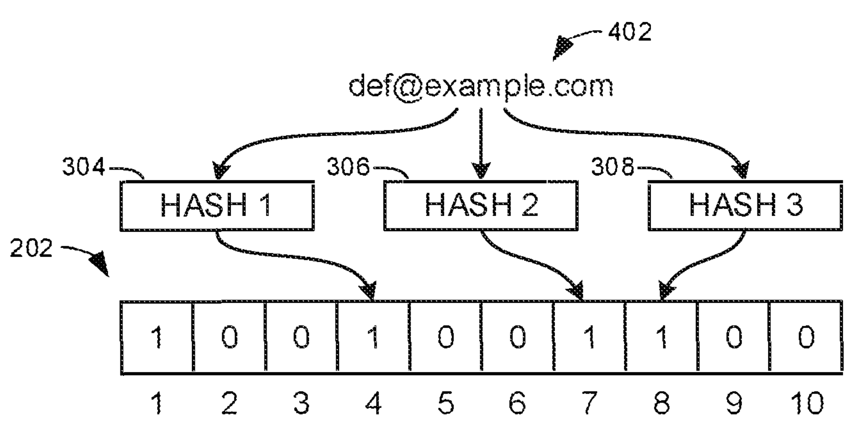
Figure 5:
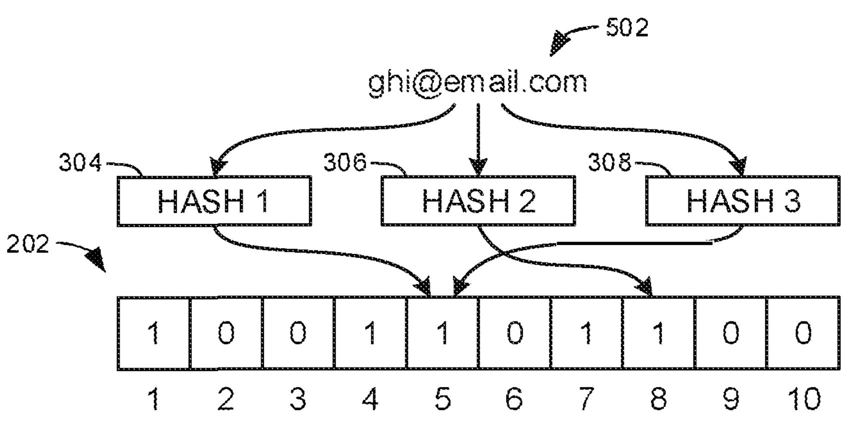

The process of generating a Bloom filter array representative of three distinct users is demonstrated in connection with FIGS. 2-5. FIG. 2 illustrates an initial Bloom filter array 202 that has a vector length of 10 bits with all values being initialized to 0. FIG. 3 illustrates the values of the elements in the Bloom filter array 202 after the mapping of a first user to the Bloom filter array 202. FIG. 4 illustrates the values of the elements in the Bloom filter array 202 after the mapping of a second user to the Bloom filter array 202. FIG. 5 illustrates the values of the elements in the Bloom filter array 202 after the mapping of a third user to the Bloom filter array 202. To populate the Bloom filter array, email addresses 302, 402, 502 of the respective first, second, and third users are used. While the email addresses 302, 402, 502 are represented in the figures, any type of PII data could additionally or alternatively be used.

As shown in FIGS. 3-5, three separate hash functions 304, 306, 308 are applied to each of the email addresses 302, 402, 502 and the particular bit or element in the Bloom filter array 202 to which the corresponding user is mapped is based on the output of the hash functions 304, 306, 308. The three hash functions 304, 306, 308 are shown for purposes of explanation but any number of hash functions may be used (e.g., only 1 hash function, 2 hash functions, more than 3 hash functions). In examples disclosed herein, each of the hash functions 304, 306, 308 are designed to map a particular input (e.g., a particular email address 302, 402, 502) to one and only one element in the Bloom filter array 202. Further, the hash functions 304, 306, 308 are designed such that the probability of a particular input being assigned to a given element in the Bloom filter array 202 is the same as the probability of being assigned to any other element in the Bloom filter array 202. That is, where the Bloom filter array 202 has a length of m (e.g., m=10 in the illustrated examples), the probability $p_i$ that a given input (e.g., a particular email address 302, 402, 502) is assigned to the ith element is $p_i=1/m$.

In some examples, for the sketch data 132*a-b* (e.g., the Bloom filter array 202) from the separate database proprietors 106*a-b* to be reliably aggregated and meaningfully analyzed, the particular hash functions used by each database proprietors 106*a-b* need to be agreed upon in advance. Further, the length of the Bloom filter array 202 as generated by each database proprietors 106*a-b* needs to be the same. Based on these constraints, if a user is a registered subscriber of both database proprietors 106*a-b* and identified as an audience member of a particular media item 114, then both database proprietors 106*a-b* will include the user in their respective Bloom filter arrays (e.g., sketch data 132*a-b*) and the user will be allocated to the same elements in both Bloom filter arrays (e.g., based on the same output of the same hash function used by both database proprietors 106*a-b*). Inasmuch as hashing functions cannot be reversed, the PII data for the particular audience members is kept private, thereby preserving the anonymity of the underlying raw data represented by the sketch data 132*a-b*.

As represented in FIG. 3, the first email address 302 is allocated to the first element of the Bloom filter array 202 based on the first hash function 304, the eighth element of the Bloom filter array based on the second hash function 306, and the fourth element of the Bloom filter array 202 based on the third hash function. As such, the bit value of each of the first, fourth, and eighth elements in the Bloom filter array 202 are flipped from a 0 (as shown in FIG. 2) to a 1 (as shown in FIG. 3).

As represented in FIG. 4, the second email address 402 is allocated to each of the fourth, seventh, and eighth elements of the Bloom filter arrays 202 based on the respective outputs of the first, second, and third hash functions 304, 306, 308. As a result, the bit vale of the seventh element in the Bloom filter array 202 is flipped from a 0 to a 1. Notably, however, there is no change in the bit values for the fourth and eighth elements in the Bloom filter array 202 because these bits were already changed to a value 1 based on the mapping of the first email address 302 to the same elements. In other words, a value of 0 in a particular element in a Bloom filter array 202 remains a 0 so long as no data entry (e.g., no user) is mapped to that particular element. However, once at least one user is mapped to a particular element the value of the element is flipped to a 1 and remains a 1 regardless of any further assignments of different users to the same element.

As represented in FIG. 5, the third email address 502 is allocated to fifth element twice (based on each of the first and third hash functions 304, 308) and to the eighth element once (based on the second hash function 306). As a result, the value of fifth element is flipped to a 1 (based on the output of the first hash function 304) and remains a 1 thereafter such that the duplicate allocation to that element (based on the output of the third hash function 308) has no effect. Further, as above, the allocation of the third email address 502 to the eighth element in the Bloom filter array 202 (based on the second hash function 306) has no effect on the corresponding bit value because the value was previously flipped to a 1.

The mapping of the output of multiple different hash functions (e.g., the first and third hash functions 304, 308) to the same element (e.g., the fifth element in FIG. 5) for a single user identifier (e.g., third email address 502) is referred to as a hash collision. There is always some probability that a hash collision may occur when multiple hash functions are used. However, the probability of a hash collision may be reduced by increasing the length of the Bloom filter array 202 (e.g., increasing the number of elements in the array to which a user may be allocated). In many applications, the number of elements in a Bloom filter array may number in the hundreds or even in the thousands such that hash collisions are relatively rare. Relatively long Bloom filter arrays also reduce the likelihood of the array becoming saturated. A Bloom filter array becomes saturated when an overly large proportion of the bits are flipped to a value of 1. As mentioned above, once a bit value is flipped to a 1 in a Bloom filter array, the value remains at a value of 1 thereafter. Thus, as the number of users to be represented in a Bloom filter array increase, there will be an ever increasing number of is until (theoretically) all 0s have become 1s. When a Bloom filter array is entirely filled with is (or has an overly large proportion of 1s) it is no longer possible to infer anything from the data sketch. Accordingly, Bloom filter arrays are designed with a sufficient length relative to an expected size of the database to be represented to reduce (e.g., avoid) saturation so that the resulting sketch data remains meaningful and valuable.

While longer Bloom filter arrays reduce the likelihood of hash collisions and reduce the likelihood of saturation occurring, having Bloom filter arrays that are overly long presents concerns for user privacy. For instance, although the Bloom filter array does not contain any personally identifiable information (PII) data (e.g., the email addresses 302, 402, 502), the flipping of bits from 0 to 1 is based on a hash of such PII data. As such, if a Bloom filter array is sparsely populated because of a relatively large number of elements to which each user may be allocated and/or a relatively small database represented in the Bloom filter array, it is possible that separate users will be mapped to separate elements in the Bloom filter array with no overlap. In such a situation, there may be a loss of privacy if a third-party entity has access to the Bloom filter array and has independent access to the email addresses 302, 402, 502 and knows the particular hash function(s) used to populate the Bloom filter array 202. In particular, the third party may be able to confirm whether or not a particular user was included in the sketch data represented by the Bloom filter array 202 by regenerating the hashes and mapping the outputs to the Bloom filter array 202 to see whether the corresponding elements have a bit value of 0 or 1. However, this privacy concern is somewhat mitigated for very large databases and/or Bloom filter arrays with short lengths because multiple user are more likely to map to the same element in the Bloom filter array 202. That is, a bit value of 1 in a particular element of the Bloom filter array 202 may correspond to multiple users in a database the Bloom filter array 202 is created to represent such that a third-party entity may only confirm whether it is possible that a particular user is included in the dataset underlying the Bloom filter array 202. Therefore, the length of a Bloom filter array is often defined based on a tradeoff between increasing user privacy (by reducing the vector length) and reducing saturation for more reliable statistics (by increasing the vector length). Notably, if a third-party entity determines that the output of a hash function for a particular user corresponds to an element in the Bloom filter array 202 that has a value of 0, the third-party entity can at least confidently confirm that the particular user is not included in the underlying dataset. Thus, while Bloom filters can generate false positives when testing for dataset membership, false negatives are impossible.

Even though the contents of a database may be summarized by sketch data in the form of a Bloom filter array, the mere fact of including the data associated with a particular user in sketch data for a corresponding database still has the potential to expose the user to a loss of privacy based on differences in the summary statistics depending on whether or not the user information of the particular user is included. Often, summary statistics shared outside of a walled garden (closed platform) system are designed to be differentially private. Summary statistics are differential private if a third party having access to the summary statistics cannot determine whether the user information of a particular individual was used in generating the summary statistics. Differential privacy is defined mathematically by the concept of ε-differential privacy, which also defines the parameters under which noise must be added to the summary statistics to ensure the resulting summary statistics are differentially private.

Thus, in some examples, to satisfy the requirements of differential privacy, noise is introduced into the Bloom filter array 202 before it is shared with other (e.g., untrusted) entities. More particularly, noise is added to the Bloom filter array 202 by flipping values of different ones of the bits in the Bloom filter array 202.

As outlined above, typical Bloom filter arrays are generated by flipping particular elements with a value of 0 to a value of 1 after the first assignment of a user to such elements and then retaining the value of 1 regardless of how many other users are assigned to the same elements. This one direction flipping of bits from 0s to 1s can lead to saturation of the Bloom filter array. Unlike such Bloom filter arrays, examples disclosed herein involve the flipping of the value of a particular element each time a user is allocated to that particular element. Thus, like traditional Bloom filter arrays, if the value of the element is 0 and a user is assigned to that element, the value flips to 1. However, unlike traditional Bloom filter arrays, if the value of the element is 1 (based on a previously allocated user) and another user is assigned to that element, the value flips back to a 0. In other words, the value for any given element alternates back and forth between 0 and 1 each time another user is allocated to the given element. Stated differently, the final value for a given element in example Bloom filter arrays disclosed herein depends on whether the total number of users are assigned to the given element. If an even number of users are assigned to an element, the final value of the element will be the same as its initial value (e.g., the initialized 0 value will end up as a 0). By contrast, if an odd number of users are assigned to an element, the final value of the element will be the opposite of its initial value (e.g., the initialized 0 value will end up as a 1).

The final value in a Bloom filter array after all data entries (e.g., users) have been assigned to respective elements in the Bloom filter array may be determined based on modulo 2 arithmetic. Stated generally, in mathematics "modulo d" is defined as the remainder after dividing an integer number by d. The possible output is any number between 0 and d−1. Two numbers are said to be congruent if they share the same remainder. This can be stated as $a \equiv b \pmod{d}$. For example 17 and 27 are both congruent modulo 10 as they share the same remainder of 7 after dividing by 10, which is written as a congruence relation as 17≡27 (mod 10). The symbol for addition can be generalized in modulo arithmetic with the symbol $\oplus_d$ illustrating it is the result of the ordinary addition modulo d which is the final answer. We have $7\oplus_{10}=1$, as 7+4=11, which, after dividing by 10, yields a remainder 1. Most people are familiar with modulo 12 in daily lives as 'clock arithmetic.'

Modulo 2 arithmetic, as used in examples disclosed herein, deals with only two numbers, {0, 1}. Applying the operation (mod 2) to any even number will return the value 0, whereas applying (mod 2) to an odd number will return the value 1. Rephrased in terms of congruent relationships we would have (even integer)=0 (mod 2) and (odd integer)=1 (mod 2). The full addition table for modulo 2 arithmetic is shown below in Table 1. As can be seen in Table 1, every time we increment the value starting from 0 it alternates between 1 and 0 back and forth. $0\oplus_2 1\oplus_2 1=(0\oplus_2 1)\oplus_2 1=1\oplus_2 1=0$.

TABLE 1

| Modulo 2 addition | | |
|---|---|---|
| $\oplus_2$ | 0 | 1 |
| 0 | 0 | 1 |
| 1 | 1 | 0 |

Figure 6:
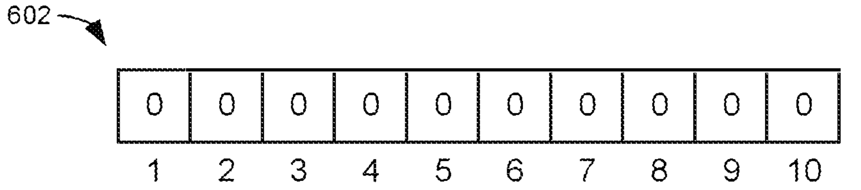
FIGS. 6-9 illustrate the creation of an example modulo 2 Bloom filter array in accordance with teachings disclosed herein.
Figure 7:
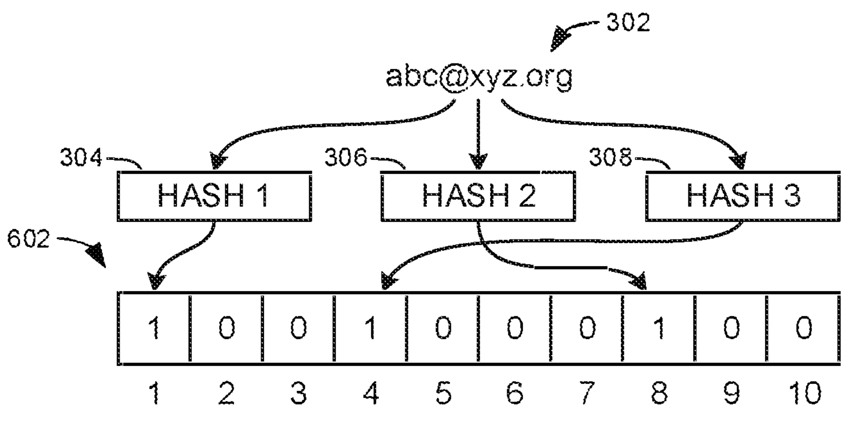
Figure 8:
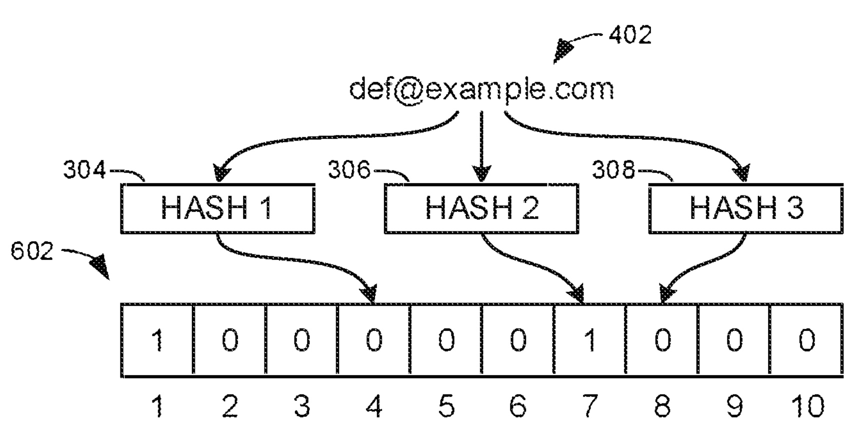
Figure 9:
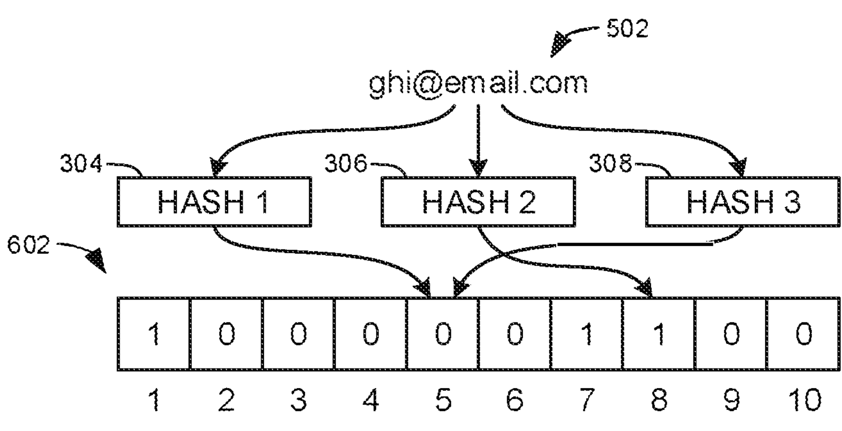

Alternating between 0 and 1 based on modulo 2 addition for increasing values is equivalent to flipping the value between 0 and 1 at every assignment of the Bloom filter as demonstrated in connection with FIGS. 6-9. For purposes of clarity, a Bloom filter array generated by repeatedly flipping the values of elements back and forth between 0 and 1 as disclosed herein is referred to as a modulo 2 Bloom filter array to distinguish it from a traditional Bloom filter array in which once an element is flipped to a value of 1 it remains at a value of 1. That is, as used herein, the term "Bloom filter array" is a generic term that includes both traditional Bloom filter arrays and modulo 2 Bloom filter arrays. FIG. 6 illustrates an initial modulo 2 Bloom filter array 602 that has a vector length of 10 bits with all values being initialized to 0 in a similar manner to the traditional Bloom filter array 202 of FIG. 2. FIG. 7 illustrates the values of the elements in the modulo 2 Bloom filter array 602 after the mapping of a first user to the Bloom filter array 602. FIG. 8 illustrates the values of the elements in the modulo 2 Bloom filter array 602 after the mapping of a second user to the Bloom filter array 602. FIG. 9 illustrates the values of the elements in the modulo 2 Bloom filter array 602 after the mapping of a third user to the Bloom filter array 602. In the illustrated example of FIGS. 6-9, the same three hash functions as used in FIGS. 2-5 are applied to the same email addresses 302, 402, 502 as in FIGS. 2-5. As a result, the particular elements to which each user is assigned in the modulo 2 Bloom filter array 602 of FIGS. 6-9 correspond to the same elements to which the users were assigned in the traditional Bloom filter array 202 of FIGS. 2-5.

Thus, after the first user has been assigned to the modulo 2 Bloom filter array 602 as represented in FIG. 7, the first, fourth, and eighth elements are flipped to a value of 1 in a similar manner to the traditional Bloom filter array 202 in FIG. 3. However, after assignment of the second user to the fourth, seventh, and eighth elements, as shown in FIG. 8, the modulo 2 Bloom filter array 602 differs from the traditional Bloom filter array 202 at the corresponding point represented in FIG. 4. More particularly, rather than the fourth element remaining at a value of 1 as in FIG. 4, the bit value is flipped back to a 0 in FIG. 8 because of a second entry assigned to the fourth element. Similarly, the eighth element in the modulo 2 Bloom filter array 602 is flipped back to a 0 in FIG. 8 (from a 1 previously in FIG. 7) because of a second entry assigned to the eighth element. The seventh element in the modulo 2 Bloom filter array 602 of FIG. 8 was previously a 0 (FIG. 7) and, therefore, is flipped to a 1 in a similar manner to the traditional Bloom filter array 602 of FIG. 4. In FIG. 9, the fifth element is flipped to a 1 based on the output of the first hash function but then flipped back to a 0 based on the output of the second hash function. That is, the value of the fifth element remains the same as before because two entries (e.g., an even number of entries) are assigned to the same element. Further, eighth element in the modulo 2 Bloom filter array 602 is flipped back to a 1 for a second time in FIG. 9 because a third entry is assigned to the eighth element.

In the illustrated example of FIG. 9, every element in the Bloom filter array 602 that is associated with an odd number of hash function outputs mapped thereto has a value of 1. That is, the first and seventh elements have a value of one because only a single user was assigned to them from a single hash function. Further, the eighth element also has a value of 1 because each of the three separate users were assigned to the eighth element based on a single hash function each. Every element in the Bloom filter array 602 of FIG. 9 that is associated with an even number (including 0) of hash function outputs mapped thereto has a value of 0. For instance, the second, third, sixth, ninth, and tenth elements are all 0 because no users were assigned to those elements. Further, the fourth and fifth elements have a value of 0 because each element was assigned a user twice. More particularly, the fourth element was assigned the first and second user once each and the fifth element was assigned the third user twice (based on two different hash functions).

As can be seen, the modulo 2 Bloom filter array 602 of FIG. 9 includes fewer is in the array than the traditional Bloom filter array 202 of FIG. 5 because the fourth and fifth elements have a value of 0 in FIG. 9, whereas the same elements have a value of 1 in FIG. 5. The fewer elements with a value of 1 resulting from the modulo 2 approach to generating the Bloom filter array 602 represented in FIGS. 6-9 eliminate concerns of saturation (e.g., an overly large proportion of the elements in the Bloom filter array becoming a 1). Indeed, regardless of how many entries are in a database, it is highly unlikely that the Bloom filter array 602 will ever become all is (or substantially all 1s) because every other assignment of a new entry to any particular element will flip the element back to the value of 0. By contrast, the traditional Bloom filter array generation process outlined above in connection with FIGS. 2-5 will ultimately result in the Bloom filter array 202 reaching saturation with all or substantially all elements having a value of 1. As a result, the modulo 2 approach to Bloom filter array generation disclosed herein provides a technical advantage over the traditional approach because the same information can be represented in a Bloom filter array of a shorter length because there is less concern of the vector saturating with all 1s. A shorter Bloom filter array provides a technical advantage because it takes up less memory space and can be analyzed with greater efficiency (e.g., less processing capacity and/or in less time) than a traditional Bloom filter array that requires a longer length to avoid concerns of saturation.

The modulo 2 approach to generating Bloom filter arrays disclosed herein also provides for increased privacy because it eliminates the possibility of either confirming the presence or absence of a particular user within an underlying dataset. That is, whereas traditional Bloom filters make false negatives for testing the membership of a user in a dataset impossible such that a user can be conclusively confirmed to not be in the dataset, a user cannot be conclusively confirmed to be either included in the dataset or excluded from a dataset from a modulo 2 Bloom filter. Furthermore, this level of privacy is achieved without the need for adding noise. As a result, examples disclosed herein further save on processing capacity by eliminating additional operations associated with the adding of noise to Bloom filter arrays before they may be shared with third-party entities. Of course, while adding noise is no longer necessary, in some examples, noise may nevertheless still be added to further increase the level of privacy protection offered by the Bloom filter arrays disclosed herein.

The improved privacy achieved by example modulo 2 Bloom filter arrays disclosed herein may be demonstrated with reference to the allocations of 5 users to two elements (e.g., using two hash functions) of a length m=5 element array.

TABLE 2

Allocations of Users across 5 element Bloom Filter Array using Two different hash Functions

| User Name | Bit array element allocation based on Hash 1 | Bit array element allocation based on Hash 2 |
|---|---|---|
| Alice | 2 | 4 |
| Bob | 1 | 3 |
| Carol | 2 | 4 |
| Dave | 1 | 2 |
| Eve | 4 | 5 |

As represented in Table 2, Alice is assigned to the second and fourth elements of the five-element Bloom filter array. Thus, testing whether Alice is included in a traditional Bloom filter array representing an underlying dataset corresponding to a subset of the five users listed in Table 2 requires confirming that both the second and fourth elements in the Bloom filter array have a value of 1. However, this cannot conclusively confirm that Alice is in the dataset represented in the Bloom filter array; only that it is possible that Alice may be in the dataset. The reason for this uncertainty is that the values of 1 in the second and fourth elements may be attributed to other users that were assigned to the same elements. In particular, as shown in Table 2, Carol is also assigned to the second and fourth elements such that there is no way of knowing for certain whether Alice is included in the dataset and to claim she is included when it is really Carol would be a false positive. Another possible scenario giving rise to a false positive for the inclusion of Alice would be a dataset that includes only Dave and Eve. Dave is assigned to the second element and Eve is assigned to the fourth element, so Dave and Eve collectively result in both elements associated with Alice being flipped to a value of 1. By contrast, if the dataset underlying a traditional Bloom filter array included only Bob and Dave, only the first three elements in the Bloom filter array would be flipped to the value of 1. As a result, the fourth element would be a 0 and it could be conclusively determined that Alice is not in the dataset.

Unlike the traditional Bloom filter array, neither membership nor non-membership of a particular user (e.g., Alice) in an underlying dataset associated with a modulo 2 Bloom filter array can be conclusive tested or determined. That is, neither the presence nor the absence of the user in the dataset is definitive or guaranteed. The uncertainty is achieved by the repeated bit flipping between 0 and 1 as multiple users are assigned to the same elements in the Bloom filter array. Table 3 identifies two example datasets (and the resulting array of values in a corresponding modulo 2 Bloom filter array) based on different subsets of users selected from the full set of five users shown in Table 2 for each of four different scenarios including: (I) Alice is in the dataset and both assigned elements associated with Alice have a value of 1; (II) Alice is not in the dataset but both assigned elements associated with Alice have a value of 1 (this is the false positive scenario for a traditional Bloom filter array noted above); (III) Alice is in the dataset but the assigned elements associated with Alice are not both 1; and (IV) Alice is not in the dataset and the assigned elements associated with Alice are not both 1.

TABLE 3

Example Datasets and Associated Bloom filter Arrays

| | | Alice in dataset | | Alice not in dataset |
|---|---|---|---|---|
| Assigned elements for Alice both equal to 1 | Ia) | {Alice} (0**1**0**1**0) | IIa) | {Carol} (0**1**0**1**0) |
| | Ib) | {Alice, Bob} (1**1**1**1**0) | IIb) | {Dave, Eve} (1**1**0**1**1) |
| Assigned elements for Alice not both equal to 1 | IIIa) | {Alice, Carol} (0**0**0**0**0) | IVa) | {Bob} (1**0**1**0**0) |
| | IIIa) | {Alice, Dave, Eve} (1**0**0**0**1) | IVb) | {Carol, Dave, Eve} (1**0**0**0**1) |

As can be seen with reference to Table 3, the assigned elements associated with Alice (e.g., the second and fourth elements) having a value of 0 does not necessarily mean that Alice is not in the dataset. Rather, the values of 0 only means that an even number of assignments have been made to the assigned elements associated with Alice. For instance, the dataset Ma includes Alice but the second and fourth elements are nevertheless both 0 because the assignment of Carol (also in the dataset) to the same elements cancels or reverses the bit flipping that would have resulted from the assignments associated with Alice. That is, there are an even number (e.g., two) assignments to both the second and fourth elements such that the final value of the elements ends up at 0.

Notably, all four of the example datasets in the bottom row of Table 3 include an exact mismatch with the assigned elements for Alice (e.g., both the second and fourth elements are 0 rather than 1). However, there may be other combinations where either the second element or the fourth element ends up a 0 while the other element is a 1. Such element values in a traditional Bloom filter array would conclusively establish that Alice is not included in the underlying dataset. However, the same conclusion cannot be made when such element values are in a modulo 2 Bloom filter array. Rather, any combination of 0s and/or 1s is possible whether or not Alice is included in the underlying dataset. Each combination may have a different probability of likelihood that Alice is included in the dataset, but none would equal 0% or 100%. Thus, both false positives and false negatives are always possible when testing for membership of a particular user within a dataset represented by a modulo 2 Bloom filter array.

While the property of individual inferential information on test entries is unavailable for modulo 2 Bloom filter arrays, the cardinality or total number of unique entries in the underlying dataset may nevertheless still be estimated. Furthermore, cardinality estimations may be made across multiple modulo 2 Bloom filter arrays. The mathematical principles underlying the ability to estimate the cardinality of such Bloom filter arrays is the same principle corresponding to the classic problem in probability theory involving the flipping of a biased coin. Specifically, assuming there is a biased coin with the probability of getting a head being p and tail being q=1−p, the problem is to then determine what the probability is to get an even number of heads after n tosses of the coin. The solution to this problem is expressed below in Equation 1. The probability of getting an odd number of heads is expressed in Equation 2.

$$Pr(\#H \text{ is even}) = \frac{1}{2}(1 + (q - p)^n) = \frac{1}{2}(1 + (1 - 2p)^n) \quad \text{Eq. 1}$$

$$Pr(\#H \text{ is odd}) = \frac{1}{2}(1 - (q - p)^n) = \frac{1}{2}(1 - (1 - 2p)^n) \quad \text{Eq. 2}$$

Using the probabilities defined in Equations 1 and 2 can be used to estimate the cardinality of a modulo 2 Bloom filter array, B, of length m with initial values $B_i$=0 for i={1, 2, . . . , m}. Where $B_i$ is initially set to 0, it will remain 0 only if an even number of assignments were made to element or index i out of the n possible trials. Where each index is equally likely, the probability of that specific element or position in the Bloom filter array being picked is p=1/m, which is equivalent to the bias of the coin used in the theorem associated with Equations 1 and 2 above. Thus, if $B_i$ is initially set to 0, the probability that the final output after n assignments that $B_i$ is still 0 is identical to observing an even number of heads after n tosses of a biased coin where the probability of seeing a head for that coin is p=1/m.

The exact likelihood of a particular element in a Bloom filter array being associated with an even number of allocations has to consider the full joint distribution across all $2^m$ combinations of possible outcomes after doing exactly n allocations. However, if n is large enough (relative to the array length m) the likelihood can be approximated by assuming independence across the m elements of the Bloom filter array.

Let $c_E$ be the count of elements in the Bloom filter array that were assigned an even number of entries and $c_O$ be the count of elements in the Bloom filter array that were assigned an even number of entries. Where the initial values of the Bloom filter array are all 0, $c_E$ corresponds to the number of elements with a value of 0 after all assignments or allocations have been made and $c_O$ corresponds to the number of elements with a value of 1 after all assignments or allocations have been made. As each element in the Bloom filter array is assigned either an even number of times (to end up with a value of 0) or an odd number of times (to end up with a value of 1), the sum of $c_E$ and $c_O$ equals the total number of elements in the Bloom filter array (e.g., $c_E+c_O$=m). Assuming independence across the elements (e.g., based on a large n), the likelihood of obtaining counts of {$c_E$, $c_O$}, is the binomial probability distribution.

$$\mathcal{L}(n \mid \{c_E, c_O, p_E\}) = \binom{m}{c_E} p_E^{c_E} (1 - p_E)^{c_O} \quad \text{Eq. 3}$$

where $p_E$ is the probability of getting an even number of heads after n tosses of a biased coin (as expressed in Equation 1) with a probability of getting heads being p=1/m). Thus, substituting Equation 1 into Equation 3 yields.

$$\mathcal{L}(n|\{c_E, c_O, p\}) = \binom{m}{c_E}\left(\frac{1}{2}(1 + (1 - 2p)^n)\right)^{c_E}\left(\frac{1}{2}(1 - (1 - 2p)^n)\right)^{c_O} \quad \text{Eq. 4}$$

Taking the logarithm and derivative of Equation 4 with respect to n yields that the maximum likelihood occurs when $$\frac{c_E(1 - 2p)^n \log(1 - 2p)}{1 + (1 - 2p)^n} - \frac{c_O(1 - 2p)^n \log(1 - 2p)}{1 - (1 - 2p)^n} = 0 \quad \text{Eq. 5}$$

Solving for n in Equation 5 yields $$\hat{n} = \frac{\ln\left(\frac{c_E - c_O}{c_E + c_O}\right)}{\ln(1 - 2p)} = \frac{\ln\left(\frac{c_E - c_O}{m}\right)}{\ln(1 - 2p)} \quad \text{Eq. 6}$$

where the notation of n̂ indicates that Equation 6 is an estimate (based on the maximum likelihood) of the number of assignments to the Bloom filter array.

As mentioned above, each entry in a dataset represented in a Bloom filter array may be assigned to the array multiple times based on multiple different hash functions. Thus, in some situations the number of assignments to the Bloom filter array is not necessarily the cardinality of the dataset but the cardinality multiplied by k hash functions used to assign entries in the dataset to the Bloom filter array. Thus, for the estimate of n̂ to reflect the estimate of the cardinality of the Bloom filter array, Equation 6 needs to be divided by k as shown in Equation 7.

$$\hat{n} = \left(\frac{1}{k}\right)\frac{\ln\left(\frac{c_E - c_O}{m}\right)}{\ln(1 - 2p)} \quad \text{Eq. 7}$$

As long as $c_E \neq c_O$, the argument inside the logarithm in Equation 7 is not zero such that an estimate for the cardinality (e.g., n̂) is obtainable. Equality between the counts (e.g., $c_E$ and $c_O$) can only occur when exactly half of the elements in the Bloom filter array were assigned an even number of entries (resulting in a final value of 0) and exactly half the elements were assigned an odd number of entries (resulting in a final value of 1). For convenience of notation, $c_E$ may be redefined as the count $c_O$ of the number of 0s in the Bloom filter array and $c_O$ may be redefined as the count $c_1$ of the number of is in the Bloom filter array. The counts $c_0$ and $c_1$ can only be equal (albeit with a relatively small probability) when the length m of the Bloom filter array (e.g., the total number of elements in the array) is even. Accordingly, in some examples, the length of the array is defined to be odd, thereby eliminating the possibility of having an equality between the counts of 0s and 1s in the Bloom filter array.

While an odd length m for a Bloom filter array avoids the possibility the argument of the logarithm in Equation 7 from equally zero, there is the possibility that $c_E<c_O$ (e.g., $c_0<c_1$) resulting in the argument being negative. To avoid a negative argument in the logarithm, Equation 7 may be revised by taking the absolute value of the difference between the counts (with $c_0$ replacing $c_E$ and $c_1$ replacing $c_O$) as follows:

$$\hat{n} = \left(\frac{1}{k}\right)\frac{\ln\left(\frac{|c_0 - c_1|}{m}\right)}{\ln(1-2p)} \quad \text{Eq. 8}$$

Revising Equation 7 as shown in Equation 8 is appropriate because of symmetry between a Bloom filter array initialized to all 0s and a Bloom filter array initialized to all 1s. That is, if a first Bloom filter array initially beginning with all 0s ends up with a greater number of is than 0s after all assignments have been made, a second Bloom filter array initially beginning with all is will end up with a greater number of 0s than is after the same assignments have been made. Furthermore, the number of is and 0s in the first Bloom filter array will correspond to the respective number of 0s and is in the second Bloom filter array.

Typically, counting the number of is in an array is easier from a processing standpoint (based on simple addition of the bit values), the expression of cardinality can be rephrased in terms of $c_1$ itself based on the definition that $c_0+c_1=m$ to yield $$\hat{n} = \left(\frac{1}{k}\right)\frac{\ln\left(\left|1 - \frac{2c_1}{m}\right|\right)}{\ln(1-2p)} \quad \text{Eq. 9}$$

As a specific example, consider a scenario where a total of n=2000 items (e.g., users in a database) are allocated to individual elements of a modulo 2 Bloom filter array having a length m=1001 using a single hash function for a single allocation of each item (e.g., k=1). The length of the array is odd to eliminate the possibility of equality in the number of 0s and is in the array. In this example, the output Bloom filter array includes an array of bits in which a total of 510 elements had a value of 1 (e.g., $c_1$=510). In this example, the true value for n is unknown but corresponds to the cardinality of the Bloom filter array to be estimated. With the probability of p=1/m, the cardinality of the Bloom filter array may be estimated by evaluating Equation 9, which results in an estimate of $\hat{n}$=1982.16.

Equation 9 defines the estimate for the cardinality of a single modulo 2 Bloom filter array. However, in some situations, multiple different Bloom filter arrays may be provided from different entities. For instance, in some examples, each of the database proprietors 106*a-b* of FIG. 1 may provide a separate modulo 2 Bloom filter array (e.g., the sketch data 132*a-b*) to the AME 102 for aggregation and analysis. In some examples, the same media may be provided to audience members corresponding to users (e.g., subscribers) of both the database proprietors 106*a-b*. Accordingly, in some such examples, both database proprietors 106*a-b* may generate a corresponding Bloom filter array representing summary statistics of the registered users (e.g., subscribers) of each database proprietor 106*a-b* that were exposed to the media. Based on the Bloom filter arrays obtained from each of the database proprietors 106*a-b*, the AME 102 may estimate the total number of unique (e.g., deduplicated) individuals that were exposed to the media. That is, the AME 102 may estimate the reach of the media. A challenge in making this determination is that some users registered with the first database proprietor 106*a* may also be registered with the second database proprietor 106*b*. If such users are exposed to the same media via both database proprietors 106*a-b*, both database proprietors would separately report the users' exposure to the media in their respective Bloom filter arrays resulting in a duplicate reporting of the user as an audience member exposed to the media. Furthermore, as described above, the summary statistics contained in the Bloom filter arrays are differentially private such that the AME 102 cannot directly confirm whether a user is included in one, both, or neither Bloom filter array to appropriately resolve the duplication of audience members across different filters.

As outlined above, the cardinality for each modulo 2 Bloom filter array (e.g., the sketch data 132*a-b*) provided from each database proprietor 106*a-b* may be estimated. However, the cardinality of the union of the sketch data 132*a-b* from both database proprietor 106*a-b* cannot be directly determined from these separate cardinality estimates because one or more of the subscribers represented in the sketch data A 132*a* may also be represented in the sketch data B 132*b*. Examples disclosed herein enable the deduplication of audience members across both datasets to estimate the true unique audience for the particular media of interest. Furthermore, examples disclosed herein may be used to estimate the cardinality across more than two datasets when all of the datasets are represents by a corresponding modulo 2 Bloom filter array as discussed above. That is, the Bloom filter array generated by each database proprietor will have the same length m and the entries in their respective databases will be allocated to individual elements in the Bloom filter array based on the same hash function(s). In other words, the allocation of the user "John Smith" will be to the same element in every Bloom filter array associated with each database proprietor for which "John Smith" is included in the underlying dataset represented by the corresponding Bloom filter array.

Assume that there are two database proprietors 106*a-b*, each of which generates respective bit arrays of length m, $\{B^{(1)}, B^{(2)}\}$ based on the modulo 2 addition methodology outlined above and based on the same set of hash functions. For purposes of explanation, assume that the length of the Bloom filter arrays is m=9 and that the values in the two Bloom filter arrays generated by the two database proprietors 106*a-b* are as follows:

$$B^{(1)} = \{1, 1, 0, 0, 1, 0, 0, 1, 1\} \quad \text{Eq. 10}$$

$$B^{(2)} = \{1, 0, 0, 1, 0, 1, 0, 1, 0\} \quad \text{Eq. 11}$$

The bit-wise modulo 2 addition between the two arrays is a new array as shown below:

$$\frac{\{1, 1, 0, 0, 1, 0, 0, 1, 1\} \oplus \{1, 0, 0, 1, 0, 1, 0, 1, 0\}}{\{0, 1, 0, 1, 1, 1, 0, 0, 1\}} \quad \text{Eq. 12}$$

The output array shown in Equation 12 is equivalent of doing bit-wise $$B_i^{(1)} \oplus_2 B_i^{(2)}$$

for each index i={1, 2, . . . , m}. Despite being a bit array of length m derived from a union between two other arrays, the resulting array is not the modulo 2 Bloom filter array of the union of the two underlying datasets. This is because for the allocation of any user that belongs to both datasets is the same for both original Bloom filter arrays resulting in an even number of identical assignments. As noted above, an even number of assignments in modulo 2 arithmetic is identical to zero. Thus, a user that is represented in the Bloom filter arrays provided by both database proprietors 106*a-b* is counted twice in the bit-wise union, which has the effect of leaving the value unchanged. In other words, users included in both underlying datasets effectively become invisible during the bit-wise modulo 2 addition shown above. Graphically, this can be illustrated as a Venn diagram of exclusive-or across two sets.

Let the variable X represent the exclusive-or cardinality of the union of modulo 2 Bloom filter arrays (e.g., the total number of users in either the first Bloom filter array or the second Bloom filter array but not both arrays). The exclusive-or cardinality X is distinct from the true cardinality N of the union of Bloom filter arrays (e.g., the total deduplicated number of users across both Bloom filter arrays regardless of whether the users are in one or both). Further, let the variable $\hat{X}$ represent the estimate of the true value of X as the output of Equation 9. That is, $\hat{X}$ is the same as $\hat{n}$, but the different notation is now used because multiple Bloom filter arrays are now involved. To use the above example, let $\hat{X}_{\{1\}}$, $\hat{X}_{\{2\}}$, and $\hat{X}_{\{1,2\}}$ represent the respective estimates for each of the three arrays shown in Equation 12.

$$\begin{array}{r} \{1, 1, 0, 0, 1, 0, 0, 1, 1\} \rightarrow \hat{X}_{\{1\}} \\ \oplus \{1, 0, 0, 1, 0, 1, 0, 1, 0\} \rightarrow \hat{X}_{\{2\}} \\ \hline \{0, 1, 0, 1, 1, 1, 0, 0, 1\} \rightarrow \hat{X}_{\{1,2\}} \end{array} \quad \text{Eq. 13}$$

Let $n_{10}$ be the number of unique users in the first dataset but not in the second dataset, $n_{01}$ be the number of unique users in the second dataset but not in the first dataset, and $n_{11}$ be the number of unique users in both datasets. These variables are referred to herein as the disjoint cardinalities for the union of two datasets because they form a collection of mutually exclusive and exhaustive sets across all possibilities that memberships may occur between the datasets and their users included therein. Based on properties of exclusive-or unions, equalities between the disjoint cardinalities and the true exclusive-or cardinalities may be expressed as follows:

$$\begin{aligned} n_{10} + n_{11} &= X_{\{1\}} \\ n_{01} + n_{11} &= X_{\{2\}} \\ n_{10} + n_{01} &= X_{\{1,2\}} \end{aligned} \quad \text{Eq. 14}$$

If ordinary addition across the expressions in Equation 14 are performed, each disjoint cardinality is added exactly twice.

$$\begin{array}{r} n_{10} + n_{11} = X_{\{1\}} \\ n_{01} + n_{11} = X_{\{2\}} \\ + n_{10} + n_{01} = X_{\{1,2\}} \\ \hline 2(n_{01} + n_{10} + n_{11}) = X_{\{1\}} + X_{\{2\}} + X_{\{1,2\}} \end{array} \quad \text{Eq. 15}$$

As $n_{01}+n_{10}+n_{11}$ is the total number N of unique users across both datasets, Equation 15 can be expressed in terms of N as $$2N = X_{\{1\}} + X_{\{2\}} + X_{\{1,2\}} \quad \text{Eq. 16}$$

Inasmuch as each exclusive-or cardinality may be estimated using Equation 9, as outlined above, the estimate of the total cardinality of the union of two modulo 2 Bloom filter arrays may be determined by dividing the sum of those estimates by two.

$$\hat{N} = \frac{1}{2}\left(\hat{X}_{\{1\}} + \hat{X}_{\{2\}} + \hat{X}_{\{1,2\}}\right) \quad \text{Eq. 17}$$

Equation 17 is true as an estimate of $\hat{N}$ regardless of the number of hash functions used to allocate each user to the Bloom filter arrays (e.g. regardless of k) because each exclusive-or cardinality estimate within the sum has already taken into account that multiplicity of k via the $$\left(\frac{1}{k}\right)$$

factor in Equation v.

While Equation 17 defines the estimate for the cardinality of unique users across two modulo 2 Bloom filter arrays, the above methodology may be generalized to any number of Bloom filter arrays. For purposes of discussion, let r represent the number of different Bloom filter arrays, $\{B^{(1)}, \ldots, B^{(r)}\}$, to be combined. By definition of disjoint cardinalities, their sum must equal the total cardinality, as shown below for the number of Bloom filter arrays r being 1, 2, or 3.

$$\begin{aligned} N &= n_1 && (r = 1) \\ N &= n_{01} + n_{10} + n_{11} && (r = 2) \\ N &= n_{001} + n_{010} + n_{011} + n_{100} + n_{101} + n_{110} + n_{111} && (r = 3) \end{aligned} \quad \text{Eq. 18}$$

As bit-wise modulo 2 addition among a subset of the modulo 2 Bloom filter arrays is equivalent to the same modulo 2 procedure on the exclusive-or union of their respective set memberships, any individual one of the arrays or any two or more of the r arrays, up to all r arrays taken together, may be analyzed. These different combinations of the arrays provide $2^r-1$ estimates of the cardinality of various exclusive-or set unions. Thus, if there are three database proprietors 106*a-b* each providing a separate Bloom filter array, the resulting array after doing modulo 2 addition across all three arrays would produce an estimate of the true value $X_{\{1,2,3\}}$. As above, this is not the estimate of the total number of users across the union of all three datasets, but is the estimate of the number of users in either only one dataset or all three datasets together. Those users that are in any two datasets (but not the third) would effectively cancel because being allocated identically in two Bloom filter arrays (e.g., an even number of times) effectively erases the previous allocation after the modulo 2 addition. This is true in general for any combination of Bloom filter arrays.

As a further illustration, consider an output array based on the exclusive-or union of a possible subset of different Bloom filter arrays being $\{B^{(1)}, B^{(4)}, B^{(5)}, B^{(8)}, B^{(9)}\}$. The output of using Equation 9 on the bit-wise modulo 2 addition of these five arrays would produce an estimate of true exclusive-or cardinality $X_{\{1,4,5,8,9\}}$. This would estimate the total number of users in any odd-numbered combination of those datasets. In other words, this estimation would represent the total number of users that are included in only a single dataset (e.g., {1}, {4}, {5}, {8}, or {9}), included in any combination of three datasets (e.g., {1,4,5}, {1,4,8}, etc.), and included in all 5 datasets together. Those users in an even-numbered combination of the datasets would not be included in the estimate of $X_{\{1,4,5,8,9\}}$ because they self-cancel after modulo 2 addition.

As noted above in Equation 15, for two Bloom filter arrays, each disjoint cardinality (e.g., $n_{01}$, $n_{10}$, $n_{11}$) appears exactly twice in the final summation of all exclusive-or cardinality estimations. When the $2^r-1$ combinations of bit-wise modulo 2 addition for r Bloom filter arrays are expanded out and summed in a similar manner to Equation 15, it can be shown that each disjoint cardinality appears exactly $2^{(r-1)}$ times. In particular, let the disjoint cardinality under interest have r indices in the subscript, indicating either {0, 1} for Boolean false or true, respectively, if the users are included in the jth dataset, with j={1, . . . , r}. Assume that s number of those indices are true with r−s indices being false (e.g., $n_{101}$ would have r=3 and s=2, where the users are in the 1st and 3rd datasets but not in the 2nd). Including the empty set along with all other possible combinations of the r indices being chosen any of {0, 1, 2, . . . , r} at a time results in a total of $2^r$ combinations. This collection is equivalent to first selecting any subset of true indices ($2^s$ combinations) and then independently selecting any subset of false indices ($2^{(r-s)}$ combinations). The total number of combinations is still $2^r$ as we have $2^r=2^s\times2^{(r-s)}$. Within the $2^s$ ways of selecting the true indices, exactly half will have even parity and half will have odd parity. As only odd parity combinations are included within the exclusive-or cardinality expansion, the total number of times that disjoint cardinality under interest appears across all $2^r$ exclusive-or combinations is therefore $2^{(r-s)}(2^s/2)=2^{(r-1)}$. This is independent of s and, therefore, valid for any disjoint cardinality. Additionally, as the empty set yielded an even parity it did not impact the number of odd parity combinations. As such, every disjoint cardinality would appear exactly $2^{(r-1)}$ times across all the expansion of exclusive-or set combinations, even if excluding the empty set within the combination.

As the sum of all disjoint cardinalities is the total cardinality of unique users across the datasets, and each disjoint cardinality is counted the same number of times, we can bring the constant out of the sum to provide the following general expression $$2^{(r-1)}N=\sum_{i\in\Omega}X_{\{i\}} \quad \text{Eq. 19}$$

where ω is the enumeration of all combinations of subsets of {1, 2, . . . , r} taken 1 at a time, 2 at a time, etc. up to r at a time. The right hand side of Equation 19 is a sum across all $2^r-1$ different exclusive-or cardinalities. By replacing the true exclusive-or cardinality, X, with its respective estimate $\hat{X}$ (corresponding to $\hat{n}$ in Equation 9), and dividing by the multiplicative constant, results in an expression for the estimation of the total unique cardinality across the union of all datasets:

$$\hat{N}=2^{(1-r)}\sum_{i\in\Omega}\hat{X}_{\{i\}} \quad \text{Eq. 20}$$

As with Equation 17, Equation 20 is true regardless of the number of hash functions used to allocate users to the respective Bloom filter arrays because the number of hash functions k is taken into account in Equation 9. Notably, in addition to estimate the total cardinality across all datasets, it is possible to estimate individual dataset intersections and, by extension, any Boolean operation of dataset memberships by using the duality of the inclusion-exclusion principle.

For purposes of explanation, an example using actual numbers for the union of three different datasets is provided below. Notably, the following example, uses example datasets with relatively small cardinalities that are represented in modulo 2 Bloom filter arrays of relatively short length. In many applications, the Bloom filter arrays may significantly longer lengths (e.g., elements numbering in the 1000s) with values representative of underlying datasets having significantly larger cardinalities (e.g., millions or more). With that stated, the following example includes the disjoint cardinalities across three datasets shown below:

$$\begin{aligned} n_{001}&=13 \\ n_{001}&=10 \\ n_{011}&=4 \\ n_{100}&=11 \\ n_{101}&=10 \\ n_{110}&=17 \\ n_{111}&=10 \end{aligned} \quad \text{Eq. 21}$$

yielding a total of 75 unique individuals. Notably, the individual disjoint cardinalities in Equation 21 and the resulting total cardinality would not be known in an actual scenario but are the values to be estimated.

The total number of individuals represented in each respective dataset in this example is $$\begin{aligned} X_{\{1\}}&=n_{100}+n_{101}+n_{110}+n_{111}=48 \\ X_{\{2\}}&=n_{010}+n_{011}+n_{110}+n_{111}=41 \\ X_{\{3\}}&=n_{001}+n_{011}+n_{101}+n_{111}=37 \end{aligned} \quad \text{Eq. 22}$$

Notably, Equation 22 uses the variable X defined above as the exclusive-or cardinality. Using this notation to represent the total cardinality for a single dataset is appropriate because the exclusive-or cardinality for a single dataset is the cardinality of the set itself. In some examples, the cardinalities of each individual dataset (as shown in Equation 22) may be unknown, but are provided here for purposes of explanation. However, in some examples, the sketch data 132*a-b* provided by the database proprietors 106*a-b* may include both the Bloom filter array and the cardinality of the underlying dataset such that the values in Equation 22 may be known.

In this example, all three database proprietors agreed on k=3 different hash functions and a Bloom filter array length of m=101. The final values for all elements in each of the modulo 2 Bloom filter arrays generated by each of the database proprietors is shown below in full $$B^{(1)}=\{1, 0, 1, 0, 1, 0, 0, 0, 0, 0, 0, 0, 0, 0, 0, 1, 1, 0, 1, 1, 1, 1, 1, 0, \quad \text{Eq. 23}$$

-continued $$0, 0, 1, 0, 1, 1, 1, 0, 1, 0, 1, 1, 1, 1, 1, 1, 0, 0, 1, 1, 0, 0, 0, 0, 0, 0,$$
$$1, 0, 1, 0, 0, 0, 1, 0, 0, 0, 1, 0, 1, 0, 0, 0, 1, 0, 0, 1, 0, 1, 1, 0, 1, 1,$$
$$0, 0, 1, 1, 0, 0, 0, 1, 1, 1, 1, 1, 1, 0, 0, 0, 1, 0, 0, 0, 0, 0, 1, 1, 1\}$$

$$B^{(2)} = \{1, 0, 0, 1, 1, 1, 0, 0, 1, 1, 0, 1, 1, 0, 1, 1, 1, 1, 0, 0, 0, 0, 1,$$
$$1, 0, 0, 0, 1, 1, 1, 0, 0, 1, 0, 0, 1, 1, 1, 0, 0, 0, 1, 1, 1, 1, 0, 0, 0, 1,$$
$$0, 1, 1, 1, 0, 0, 1, 1, 0, 1, 0, 0, 0, 1, 0, 0, 1, 0, 1, 0, 0, 1, 0, 1, 0, 0,$$
$$0, 0, 1, 0, 1, 1, 1, 0, 0, 1, 0, 1, 0, 1, 0, 0, 0, 1, 1, 0, 0, 1, 1, 0, 0, 1\}$$

$$B^{(3)} = \{1, 0, 0, 0, 0, 1, 0, 0, 1, 1, 0, 0, 1, 0, 1, 1, 0, 1, 0, 1, 0, 0, 0,$$
$$1, 0, 1, 0, 0, 0, 0, 0, 1, 0, 1, 0, 1, 0, 0, 0, 1, 0, 1, 1, 1, 0, 0, 0, 1, 0,$$
$$0, 1, 1, 0, 1, 0, 0, 0, 0, 0, 0, 0, 1, 1, 0, 0, 1, 0, 1, 1, 1, 0, 1, 1, 0, 1,$$
$$1, 0, 1, 1, 1, 1, 1, 0, 1, 1, 1, 0, 0, 0, 0, 0, 0, 0, 1, 1, 0, 0, 0, 1, 0, 0\}$$

With r=3, the number of exclusive-or cardinality estimation combinations possible is $2^3-1=7$. Table 4 shows all seven combinations for bit-wise modulo 2 addition, along with summary statistics indicating the corresponding count of is ($c_1$) and the estimate of $\hat{X}$ of the corresponding exclusive-or cardinality (determined by evaluating Equation 9) alongside the associated true (but unknown) value X.

TABLE 4

Estimated and True Values for All Combinations of Exclusive-Or Cardinalities

| Combination | $c_1$ (count of 1 s) | $\hat{X}$ (estimated) | X (truth) |
|---|---|---|---|
| $B^{(1)}$ | 46 | 40.2969 | 48 |
| $B^{(2)}$ | 49 | 58.6065 | 41 |
| $B^{(3)}$ | 43 | 31.7834 | 37 |
| $B^{(1)} \oplus B^{(2)}$ | 47 | 44.4854 | 35 |
| $B^{(1)} \oplus B^{(3)}$ | 49 | 58.6065 | 45 |
| $B^{(2)} \oplus B^{(3)}$ | 42 | 29.6975 | 50 |
| $B^{(1)} \oplus B^{(2)} \oplus B^{(3)}$ | 40 | 26.1758 | 44 |
| | Sum | 289.653 | 300 |
| | Cardinality | $\hat{N}$ = 72.413 | N = 75 |

As shown in Table 4, the total cardinality estimate $\hat{N}$ corresponds to the sum of the exclusive-or cardinality estimates $\hat{X}$ divided by 4 as defined in Equation 20 for r=3. Estimates of intersections, disjoint cardinalities, or other quantities can also be determined. However, as the above example is based on relatively small cardinalities and relatively short Bloom filter arrays, the errors of such estimates may be relatively large.

As the true disjoint cardinalities are known, by construction in the above example, a simulation of multiple experiments of the above can be made to determine some statistical properties of the estimate. A Monte Carlo experiment of 10,000 simulations yielded an estimate of the expected value and standard deviation of $\hat{N}$ being 75.8209 and 10.952, respectively. As can be seen, the estimate of the sample expected value is close to the true cardinality of 75.

As indicated in Equation 14, there are $2^2-1$ equations defining each exclusive-or cardinality (e.g., $X_{\{1\}}$, $X_{\{2\}}$, $X_{\{1,2\}}$). Furthermore, as shown in Equation 14, these $2^r-1$ equations are defined based on $2^r-1$ disjoint cardinalities (e.g., $n_{01}$, $n_{10}$, $n_{11}$). Thus, if each exclusive-or cardinality can be estimated (e.g., by evaluating Equation 9), it is possible to establish a full rank linear system to solve for each of the disjoint cardinalities. With the disjoint cardinalities, any Boolean expression corresponding to user membership across one or more of the r datasets is possible. For purposes of illustration, the liner systems relating the disjoint cardinalities to the exclusive-or cardinalities are shown below in full for r={1, 2, 3}, with r=1 being trivially true but shown for completeness.

$$[1][n_1] = [X_{\{1\}}] \quad (r = 1) \qquad \text{Eq. 24}$$

$$\begin{bmatrix} 0 & 1 & 1 \\ 1 & 0 & 1 \\ 1 & 1 & 0 \end{bmatrix} \begin{bmatrix} n_{01} \\ n_{10} \\ n_{11} \end{bmatrix} = \begin{bmatrix} X_{\{1\}} \\ X_{\{2\}} \\ X_{\{1,2\}} \end{bmatrix} \quad (r = 2) \qquad \text{Eq. 25}$$

$$\begin{bmatrix} 0 & 0 & 0 & 1 & 1 & 1 & 1 \\ 0 & 1 & 1 & 0 & 0 & 1 & 1 \\ 1 & 0 & 1 & 0 & 1 & 0 & 1 \\ 0 & 1 & 1 & 1 & 1 & 0 & 0 \\ 1 & 0 & 1 & 1 & 0 & 1 & 0 \\ 1 & 1 & 0 & 0 & 1 & 1 & 0 \\ 1 & 1 & 0 & 1 & 0 & 0 & 1 \end{bmatrix} \begin{bmatrix} n_{001} \\ n_{010} \\ n_{011} \\ n_{100} \\ n_{101} \\ n_{110} \\ n_{111} \end{bmatrix} = \begin{bmatrix} X_{\{1\}} \\ X_{\{2\}} \\ X_{\{3\}} \\ X_{\{1,2\}} \\ X_{\{1,3\}} \\ X_{\{2,3\}} \\ X_{\{1,2,3\}} \end{bmatrix} \quad (r = 3) \qquad \text{Eq. 26}$$

The above linear systems have applications in which specific database proprietors 106*a-b* provide the true cardinality associated with the modulo 2 Bloom filter arrays also provided by the database proprietors. That is, as mentioned above in connection with Equation 22, the true cardinalities for each Bloom filter array may not be known but correspond to the summation of all disjoint cardinalities associated with each Bloom filter array. Thus, if the true cardinality is known (e.g., provided by the database proprietors 106*a-b*), the estimates of the cardinalities (in the first three rows of the third column in Table 4 determined based on Equation 9) may be replaced by the true cardinalities (in the first three rows of the fourth column in Table 4). In the above example summarized in Table 4, if the true values for the cardinalities of the three separate Bloom filter arrays is used in this manner, the final estimate of the total cardinality across all three Bloom filter arrays would become $\hat{N}$=71.2413.

The examples described above assume that each database proprietor 106*a-b* provides a single modulo 2 Bloom filter array that the AME 102 may then analyze in combination. However, in some examples, each database proprietor 106*a-b* may generate a group of multiple modulo 2 Bloom filter arrays. A group of multiple Bloom filter arrays may be generated to reduce the size of each individual Bloom filter array. That is, two smaller Bloom filter arrays may contain the same amount of information as one larger Bloom filter array. In some examples, the different Bloom filter arrays in the group have the same length m, but differ from one another in that different hash functions are used to assign users to the elements in the respective Bloom filter arrays. In such examples, Equation 9 may still be used with p=1/m. However, the value of $c_1$ is no longer the count of is in a single array. Rather, the value of $c_1$ used in such examples is the average of the counts across the multiple Bloom filter arrays in the group from the corresponding database proprietor 106*a-d*.

As can be seen with reference to Equation 8, the largest possible cardinality estimate for a given Bloom filter array occurs when $|c_0-c_1|=1$, which corresponds to when the number of 1s and 0s in the array only differ by one. This situation arises when the Bloom filter array is maximally mixed between elements being assigned an even or odd number of times. This extreme case reduces Equation 8 to $$\hat{n}_{max} = \left(\frac{1}{k}\right)\frac{\ln\left(\frac{1}{m}\right)}{\ln(1-2p)} \quad \text{Eq. 27}$$

With p=1/m, the minimum array length m can be solved for that gives the maximum possible estimate of n. For large enough m (relative to n), the right hand side of Equation 27 can be approximated as $$\hat{n}_{max} \sim \frac{m\ \ln(m)}{2k} \quad \text{Eq. 28}$$

Equation 28 can be solved for m, given n and k, yielding $$m \sim \frac{2nk}{W(2nk)} \quad \text{Eq. 29}$$

where W(z) is the Lambert W function, defined as the principal solution for w in the equation $z=we^w$. This allows an estimate of the shortest array length that could produce an estimate equal to the value of n. Shorter bit arrays will have $n_{max}<n$ and, if n is the true cardinality, the final estimate will be biased downwards. If $n_{max}>n$, the individual exclusive-or estimates would be balanced in some sense in that the over-estimated values will be offset by the under-estimated values.

By way of example, given that $n=10^6$ and a modulo 2 Bloom filter array is to be constructed with users assigned to individual elements three different times using k=3 hash functions, the length of the bit array, according to Equation 29, would need to be m≥460,147.33 in order for $n=10^6$ to be even possibly estimated. Notably, the length of the bit array that satisfies Equation 27, for $n=10^6$, is m≥460,148.26, thereby indicating that the approximation of Equation 29 is relatively accurate. While the above example identifies the shortest suitable array length for a given cardinality, in some examples, the array length may be defined to be longer to reduce any overall bias or error. Assuming a Bloom filter array begins with all values set to 0 and the array length m=(5/4)nk, a large n would produce, on average, a 60:40 split between values of the array being 0 and 1 respectively. This provides a quick first-order approximation for the array length m, given an initial estimate of n, so that there is roughly a 50/50 split between 0s and is in the array (e.g., not too under-saturated, and not too over-saturated.

The foregoing examples assume that the probability that any particular user is assigned to any particular element in a Bloom filter array is uniform across all elements in the Bloom filter array. That is, the probability of assignment to any particular element is the same as for any or element such that p=1/m. However, the probability distribution need not be uniform but could be based on any suitable distribution. That is, the probability of the ith element in a Bloom filter array is assigned a particular user may be defined as $p_i=f(i)$ for some function of i. In such examples, the probability of the number of assignment to any given element, $p_E$, would also be index dependent, which may be expressed as follow for k hash functions $$p_E^{(i)} = \frac{1}{2}\left(1 + (1-2p_i)^{(nk)}\right) i \in \{1, \ldots, m\} \quad \text{Eq. 30}$$

From Equation 30, $$p_O^{(i)}$$

may be derived because $$p_E^{(i)} \text{ and } p_O^{(i)}$$

must sum to 100%. The likelihood of an assignment to any particular element becomes a product across all indices, $$\mathcal{L}(n|\{B_i\}, \{p_i\}, k) = c\prod_{i=1}^{m}\left(p_E^{(i)}\right)^{[B_i=0]}\left(p_O^{(i)}\right)^{[B_i=1]} \quad \text{Eq. 31}$$

where c is a constant independent of n and does not contribute to the maximum likelihood estimation, and [A] is the Iverson bracket that has a value equal to 1 if the state A is true and 0 otherwise. The log-likelihood turns into a sum $$\mathcal{L}(n|\{B_i\}, \{p_i\}, k) = c\sum_{i=1}^{m}[B_i=0]\log\left(p_E^{(i)}\right) + [B_i=1]\log\left(p_O^{(i)}\right) \quad \text{Eq. 32}$$

which must be solved numerically for n.

The estimation of the total unique cardinality across r datasets as defined in Equation 20 is still valid for Bloom filter arrays based on non-uniform allocation of users across the elements. However, rather than solving for $\hat{X}$ directly (using Equation 9), $\hat{X}$ is solved for by maximizing the log-likelihood numerically from Equation 32 for each bit-wise modulo 2 addition (each combination of one or more of the r datasets). As a specific example, assume that $p_i$ follows a geometric distribution with parameter $p_0$. That is, $$p_i = (1-p_0)^{(i-1)}p_0 \quad \text{Eq. 33}$$

Based on this example, if $$p_0 = 0.01 \text{ and } n = 100 \text{ with } k = 1,$$

then $p_E^{(i)}$ for $i = \{1, 10, 100\}$ would equal {0.56631, 0.579097, 0.738031}.

As mentioned above, modulo 2 Bloom filter arrays generated in accordance with teachings disclosed herein provide greater privacy than traditional Bloom filter arrays because neither the absence nor the presence of a particular user within an underlying dataset can be confirmed with certainty. In some instances, to increase the privacy of traditional Bloom filter arrays, after all users have been allocated to their respective elements in the array, noise may be added to the array by flipping the value of ones of the elements. Inasmuch as modulo 2 Bloom filter arrays provide privacy without the addition of noise, the process to generate modulo 2 Bloom filter arrays is an improvement in processor efficiency relative to traditional Bloom filter array generation. In some examples, database proprietors 106*a-b* may nevertheless choose to add noise to modulo 2 Bloom filter arrays to further increase the protection of the privacy of the users represented in the Bloom filter arrays.

Examples disclosed herein may estimate the cardinality across multiple modulo 2 Bloom filter arrays $\{B^{(1)}, B^{(r)}\}$ in which noise has been added according to a random Bernoulli process with the jth Bloom filter array having Bernoulli parameter $p_j$. The noise may be added in any suitable matter during the process of generating the noisy Bloom filter array. For instance, for different approaches, which have equivalent outcomes, include: (1) starting with zero-valued bit-array of length m, the ith bit is incremented by one with probability pj to add noise, after which the allocation of users to the array follows the modulo 2 methodology outlined above; (2) starting with zero-valued bit-array of length m, first allocate all users following the modulo 2 methodology outlined above, and then add a count of one to the ith bit with probability $p_j$ with result reported using modulo 2 addition; (3) starting with zero-valued bit-array of length m, first allocate all users following the modulo 2 methodology outlined above, and then flip the value of the ith element with probability $p_j$ to add noise; and (4) instead of a zero-valued bit-array, the initialization is a random independent and identically distributed (IID) sample of size m according to the Bernoulli($p_j$) distribution, after which allocation of users follows the modulo 2 methodology outlined above.

Estimating the unique cardinality across multiple modulo 2 Bloom filter arrays with Bernoulli noise is based on solving a problem dealing with a collection of biased coins. In particular, given n different coins each with possibly different probabilities of heads $\{p_i, \ldots, p_n\}$, where all coins are flipped once, the probability there will be an even number of heads observed may be expressed as follows:

$$Pr(X = \{0, 2, 4, \ldots, n\}) = \frac{1}{2}\left(1 + \prod_{i=1}^{n}(1 - 2p_i)\right) \quad \text{Eq. 34}$$

where X is the random variable of the number of heads. As a specific example, consider the scenario where a first coin has a bias of $p_1$, a second coin has a bias of $p_2$, and n coins all have the same bias p. The probability an even number of heads will be observed among this collection of n+2 coins, if each coin is flipped once, is the following:

$$p_E = \frac{1}{2}(1 + (1 - 2p_1)(1 - 2p_2)(1 - 2p)^n) \quad \text{Eq. 35}$$

The above example is similar to adding noise to a modulo 2 Bloom filter array in that the allocation of users to a particular element in the Bloom filter array is comparable to flipping n coins with the same probability of heads being p=1/m, and the addition of noise is comparable to flipping one other coin with some independent probability of heads $p_j$. Thus, $p_j$ is comparable to $p_1$ in Equation 35 with the $p_2$ term being dropped out. When no noise is included, the $p_1$ term also drops out to result in $$p_E = \frac{1}{2}(1 + (1 - 2p)^n) \quad \text{Eq. 36}$$

which is the same as Equation 1 discussed above with the maximum likelihood solution being defined by Equation 9.

Thus, the addition of Bernoulli noise introduces a multiplicative constant within Equation 36 labelled as d in the following expression:

$$p_E = \frac{1}{2}(1 + d(1 - 2p)^n) \quad \text{Eq. 37}$$

By analogy to the coin example described above in connection with Equation 35, it can be seen that $d=1-2p_j$.

With the inclusion of this constant to account for the addition of noise, the maximum likelihood solution for the cardinality n (defined in Equation 9 for the no noise scenario) becomes $$\hat{n} = \left(\frac{1}{k}\right)\frac{\ln\left(\left|\frac{1}{d}\left(1 - \frac{2c_1}{m}\right)\right|\right)}{\ln(1 - 2p)} \quad \text{Eq. 38}$$

The absolute value within the logarithm is needed due to symmetry as explained above in connection with Equation 9. Furthermore, there is another symmetry between $p_j$ and $1-p_j$ bit flipping probabilities that is also valid and the reason why d is also contained in the absolute value.

The expression for d is different when multiple Bloom filter arrays are considered together using bit-wise modulo 2 arithmetic across their arrays (as described above in connection with Equation 12). In particular, consider any subset of the arrays expressed as the set {i}. The bit-flipping noise added to each Bloom filter array within the subset is equivalent to one more possible additional allocation according to their own respective probability. This results in $$d_{\{i\}} = \prod_{j \in \{i\}}(1 - 2p_j) \quad \text{Eq. 39}$$

where the product is taken across all Bloom filter arrays within the subset given by the set {i}. Following the same maximization of likelihood, the estimate of the exclusive-or cardinality is given as $$\hat{X}_{\{i\}} = \left(\frac{1}{k}\right)\frac{\ln\left(\left|\frac{1}{d_{\{i\}}}\left(1 - \frac{2c_1}{m}\right)\right|\right)}{\ln(1 - 2p)} \quad \text{Eq. 40}$$

where $c_1$ is now the number of 1's in the bit-wise modulo 2 addition across the arrays given in the subset {i}. The cardinality estimation $\hat{N}$ across all Bloom filter arrays is determined in accordance with Equation 20 outlined above.

The above examples for adding noise can be generalized further. In particular, in some examples, instead of Bernoulli ($p_j$) for each bit of Bloom filter array j, the probability is repeating $m_j$ times creating Bernoulli($m_j$, $p_j$). This is comparable to either adding $m_j$ coins with probability $p_j$, or $m_j$ possible bit-flipping noise each with the probability $p_j$. The only modification for this generation is that the term inside the parenthesis within Equation 39 is exponentiated to the $m_j$ power.

For purposes of explanation, consider the example described above involving three different Bloom filter arrays $\{B^{(1)}, B^{(2)}, B^{(3)}\}$ of length m=101 in which k=3 hash functions were used and the total unique audience (e.g., cardinality) across all three Bloom filter arrays is 75. Further, as above, the disjoint cardinalities between the three Bloom filter arrays is defined in Equation 21 and the total number of individuals represented in each Bloom filter array (e.g., the true cardinality of each Bloom filter array) is defined in Equation 22. In this example, further assume that noise was added to each of the three Bloom filter arrays by probabilistically bit-flipping the value of each element in the respective Bloom filter array with given and known probabilities $\{p_1, p_2, p_3\}=\{0.10, 0.15. 0.20\}$. That is, on average, 10% of the bits in the first Bloom filter array would be flipped, 15% of the bits in the second Bloom filter array would be flipped, and 20% of the bits in the third Bloom filter array would be flipped. While these proportions of bits being flipped is expected on average, it does not follow that exactly 10%, 15% and 20% of the bits were actually flipped in the corresponding Bloom filter arrays. Bit flipping of elements according to the above probabilities was simulated for the three example Bloom filter arrays defined above in Equation 23. The same bit arrays as well as the resulting arrays with noise added are shown below in Table 5. Further, the bits that were flipped due to the addition of noise are demarcated via bolding and underlining.

TABLE 5

Example Bloom Filter Arrays Before and After the Addition of Noise

| | Original | | | With Noise Added | | |
|---|---|---|---|---|---|---|
| i | $B^{(1)}$ | $B^{(2)}$ | $B^{(3)}$ | $B^{(1)}$ | $B^{(2)}$ | $B^{(3)}$ |
| 1 | 1 | 1 | 1 | 1 | 1 | **0** |
| 2 | 0 | 0 | 0 | **1** | 0 | **1** |
| 3 | 1 | 0 | 0 | 1 | 0 | **1** |
| 4 | 0 | 1 | 0 | 0 | 1 | 0 |
| 5 | 1 | 1 | 0 | 1 | 1 | **1** |
| 6 | 0 | 1 | 1 | 0 | 1 | **0** |
| 7 | 0 | 0 | 0 | 0 | 0 | 0 |
| 8 | 0 | 0 | 0 | 0 | 0 | 0 |
| 9 | 0 | 1 | 1 | 0 | 1 | 1 |
| 10 | 0 | 1 | 1 | 0 | 1 | 1 |
| 11 | 0 | 0 | 0 | 0 | 0 | 0 |
| 12 | 0 | 1 | 0 | 0 | 1 | 0 |
| 13 | 0 | 1 | 1 | 0 | 1 | 1 |
| 14 | 0 | 0 | 0 | 0 | 0 | 0 |
| 15 | 0 | 1 | 1 | 0 | 1 | 1 |
| 16 | 1 | 1 | 1 | 1 | 1 | 1 |
| 17 | 1 | 1 | 0 | 1 | 1 | 0 |
| 18 | 0 | 1 | 1 | 0 | 1 | 1 |
| 19 | 1 | 0 | 0 | 1 | 0 | 0 |
| 20 | 1 | 0 | 1 | 1 | 0 | 1 |
| 21 | 1 | 0 | 0 | 1 | 0 | **1** |
| 22 | 1 | 0 | 0 | **0** | 0 | 0 |
| 23 | 1 | 1 | 0 | 1 | 1 | 0 |
| 24 | 0 | 1 | 1 | 0 | 1 | 1 |
| 25 | 0 | 0 | 0 | 0 | **1** | 0 |
| 26 | 0 | 0 | 1 | 0 | **1** | 1 |
| 27 | 1 | 0 | 0 | 1 | 0 | 0 |
| 28 | 0 | 1 | 0 | 0 | 1 | **1** |
| 29 | 1 | 1 | 0 | 1 | 1 | 0 |
| 30 | 1 | 1 | 0 | 1 | 1 | 0 |
| 31 | 1 | 0 | 0 | 1 | 0 | 0 |
| 32 | 0 | 0 | 1 | 0 | 0 | 1 |
| 33 | 1 | 1 | 0 | 1 | **0** | 0 |
| 34 | 0 | 0 | 1 | 0 | 0 | 1 |
| 35 | 1 | 0 | 0 | 1 | **1** | 0 |
| 36 | 1 | 1 | 1 | 1 | 1 | 1 |
| 37 | 1 | 1 | 0 | 1 | 1 | 0 |
| 38 | 1 | 1 | 0 | 1 | 1 | 0 |
| 39 | 1 | 0 | 0 | 1 | 0 | **1** |
| 40 | 1 | 0 | 1 | 1 | 0 | 1 |
| 41 | 0 | 0 | 0 | 0 | **1** | 0 |
| 42 | 0 | 1 | 1 | 0 | 1 | 1 |
| 43 | 1 | 1 | 1 | 1 | 1 | 1 |
| 44 | 1 | 1 | 1 | 1 | 1 | 1 |
| 45 | 0 | 1 | 0 | **1** | 1 | 0 |
| 46 | 0 | 0 | 0 | **1** | 0 | **1** |
| 47 | 0 | 0 | 0 | 0 | 0 | 0 |
| 48 | 0 | 0 | 1 | 0 | **1** | **0** |
| 49 | 0 | 1 | 0 | 0 | **0** | **1** |
| 50 | 0 | 0 | 0 | **1** | 0 | 0 |
| 51 | 1 | 1 | 1 | 1 | 1 | 1 |
| 52 | 0 | 1 | 1 | 0 | 1 | 1 |
| 53 | 1 | 1 | 0 | 1 | 1 | 0 |
| 54 | 0 | 0 | 1 | 0 | 0 | 1 |
| 55 | 0 | 0 | 0 | **1** | 0 | 0 |
| 56 | 0 | 1 | 0 | 0 | 1 | 0 |
| 57 | 1 | 1 | 0 | 1 | 1 | 0 |
| 58 | 0 | 0 | 0 | 0 | 0 | **1** |
| 59 | 0 | 1 | 0 | 0 | 1 | 0 |
| 60 | 0 | 0 | 0 | 0 | 0 | 0 |
| 61 | 1 | 0 | 0 | 1 | 0 | 0 |
| 62 | 0 | 0 | 1 | 0 | 0 | **0** |
| 63 | 1 | 1 | 1 | 1 | 1 | 1 |
| 64 | 0 | 0 | 0 | 0 | 0 | **1** |
| 65 | 0 | 0 | 0 | 0 | 0 | **1** |
| 66 | 0 | 1 | 1 | 0 | 1 | 1 |
| 67 | 1 | 0 | 0 | 1 | 0 | 0 |
| 68 | 0 | 1 | 1 | 0 | 1 | **0** |
| 69 | 0 | 0 | 1 | 0 | **1** | 1 |
| 70 | 1 | 0 | 1 | 1 | 0 | **0** |
| 71 | 0 | 1 | 0 | 0 | 1 | 0 |
| 72 | 1 | 0 | 1 | 1 | 0 | 1 |
| 73 | 1 | 1 | 1 | 1 | 1 | **0** |
| 74 | 0 | 0 | 0 | **1** | **1** | **1** |
| 75 | 1 | 0 | 1 | 1 | **1** | 1 |
| 76 | 1 | 0 | 1 | 1 | 0 | 1 |
| 77 | 0 | 0 | 0 | 0 | 0 | 0 |
| 78 | 0 | 1 | 1 | 0 | 1 | 1 |
| 79 | 1 | 0 | 1 | 1 | **1** | **0** |
| 80 | 1 | 1 | 1 | 1 | 1 | **0** |
| 81 | 0 | 1 | 1 | 0 | 1 | 1 |
| 82 | 0 | 1 | 1 | 0 | 1 | 1 |
| 83 | 0 | 0 | 0 | 0 | 0 | 0 |
| 84 | 1 | 0 | 1 | 1 | **1** | 1 |
| 85 | 1 | 1 | 1 | **0** | 1 | 1 |
| 86 | 1 | 0 | 1 | 1 | 0 | 1 |
| 87 | 1 | 1 | 0 | 1 | 1 | 0 |
| 88 | 1 | 0 | 0 | **0** | 0 | 0 |
| 89 | 1 | 1 | 0 | 1 | 1 | 0 |
| 90 | 0 | 0 | 0 | 0 | 0 | 0 |
| 91 | 0 | 0 | 0 | 0 | 0 | 0 |
| 92 | 0 | 0 | 0 | 0 | **1** | 0 |
| 93 | 1 | 1 | 0 | 1 | 1 | **1** |
| 94 | 0 | 1 | 1 | 0 | 1 | **0** |
| 95 | 0 | 0 | 1 | 0 | 0 | **1** |
| 96 | 0 | 0 | 0 | 0 | 0 | 0 |
| 97 | 0 | 1 | 0 | 0 | 1 | **1** |
| 98 | 0 | 1 | 0 | 0 | 1 | 0 |
| 99 | 1 | 0 | 1 | 1 | 0 | **0** |
| 100 | 1 | 0 | 0 | 1 | 0 | 0 |
| 101 | 1 | 1 | 0 | 1 | 1 | 0 |

Table 6 shows all seven combinations of the three Bloom filter arrays using bit-wise modulo 2 addition, along with summary statistics indicating the multiplicative constant ($d_{\{i\}}$), the corresponding count of 1s ($c_1$), and the estimate of X of the corresponding exclusive-or cardinality (determined by evaluating Equation 9) alongside the associated true (but unknown) value X.

TABLE 6

Estimated and True Values for All Combinations of Exclusive-Or Cardinalities

| Combination | $d_{\{i\}}$ | $c_1$ (count of 1 s) | $\hat{X}$ (estimated) | X (truth) |
|---|---|---|---|---|
| $B^{(1)}$ | 0.800 | 49 | 54.8876 | 48 |
| $B^{(2)}$ | 0.700 | 58 | 25.8391 | 41 |
| $B^{(3)}$ | 0.600 | 46 | 31.7834 | 37 |
| $B^{(1)} \oplus B^{(2)}$ | 0.560 | 51 | 67.2528 | 35 |
| $B^{(1)} \oplus B^{(3)}$ | 0.480 | 53 | 37.8606 | 45 |
| $B^{(2)} \oplus B^{(3)}$ | 0.420 | 48 | 35.6352 | 50 |
| $B^{(1)} \oplus B^{(2)} \oplus B^{(3)}$ | 0.336 | 43 | 13.6066 | 44 |
| | | Sum | 266.865 | 300 |
| | | Cardinality | $\hat{N}$ = 66.7163 | N = 75 |

As shown in Table 6, the total cardinality estimate $\hat{N}$ corresponds to the sum of all exclusive-or cardinality estimates divided by 4 as shown in Equation 20 for r=3, yielding $\hat{N}$=66.7163. As can be seen by comparison with Table 4, the addition of noise in the Bloom filter arrays results in a different $\hat{N}$ than when no noise was added (e.g., $\hat{N}$=72.413 with no noise). As the above example is based on relatively small cardinalities and relatively Bloom filter arrays, the errors produced by the bit-flipping noise appear relatively large. However, for larger arrays and cardinalities, the bit-flipping noise would have less impact in estimation but more impact on the look of randomness of the bits in the arrays.

Figure 10:
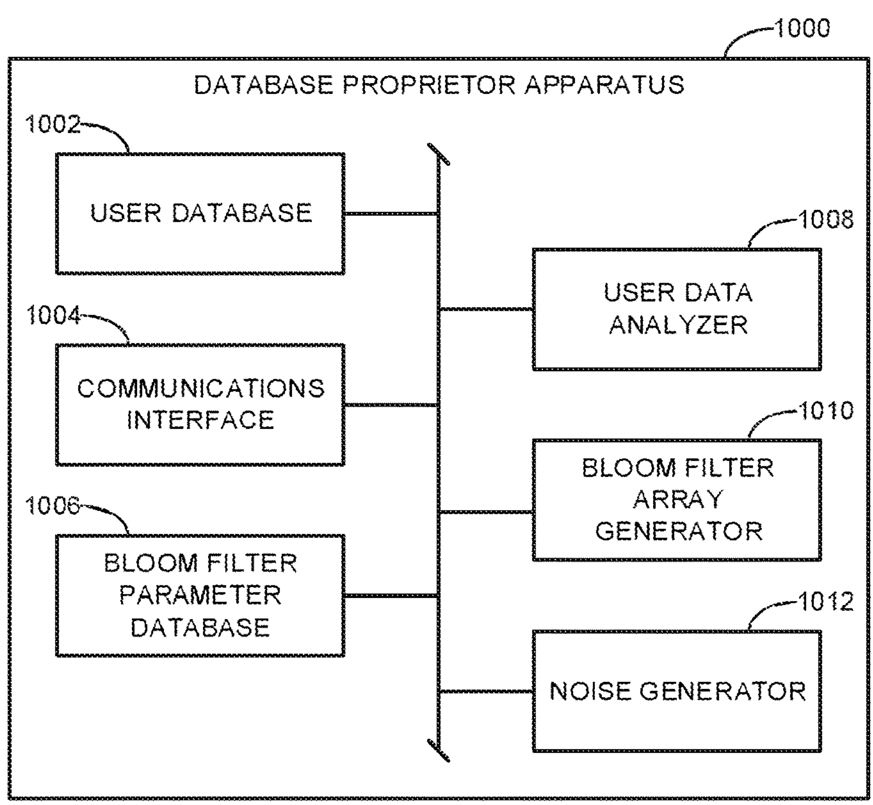
FIG. 10 is a block diagram of an example database proprietor apparatus of any one of the database proprietors of FIG. 1.

FIG. 10 is a block diagram of an example database proprietor apparatus 1000. The example database proprietor apparatus 1000 of FIG. 10 may correspond to any one of the database proprietors 106*a-b* of FIG. 1. As shown in the illustrated example, the database proprietor apparatus 1000 includes an example user database 1002, an example communications interface 1004, an example Bloom filter parameter database 1006, an example user data analyzer 1008, an example Bloom filter array generator 1010, and an example noise generator 1012.

The example user database 1002 stores user data associated with users (e.g., subscribers) registered with the database proprietor apparatus 1000. In some examples, the user data includes a user identifier corresponding to any suitable PII. The example communications interface 1004 enables the database proprietor apparatus 1000 to communicate with the AME 102.

The example Bloom filter parameter database 1006 stores the Bloom filter parameters used to define and/or generate one or more modulo 2 Bloom filter arrays representative of the users in the user database 1002. In some examples, some or all of the Bloom filter parameters are determined and/or received from the AME 102 (e.g., via the communications interface 1004). In some examples, some or all of the Bloom filter parameters are determined by one or more database proprietors 106*a-b*. In some examples, the Bloom filter parameters include one or more of a length (e.g., number of bits or element) in the Bloom filter array, the identification of one or more hash function(s) used to map users to different elements of the Bloom filter array and the corresponding mapping of hash function outputs to the different elements in the Bloom filter array (e.g., parameters defining the number of different hash function outputs that map to each element and the particular outputs that map to each particular element), and/or a noise parameters defining a probability with which the value of individual elements used to generate each Bloom filter array to ensure differential privacy for the corresponding Bloom filter array. Regardless of how the Bloom filter parameters are set or determined (e.g., whether by the AME 102 and/or the database proprietors 106*a-b*), the Bloom filter array length, hash functions, and corresponding hash function output mapping are to be agreed upon by all database proprietors 106*a-b*. However, each database proprietor 106*a-b* may use a different noise parameter.

The example user data analyzer 1008 analyzes user data in the user database 1002 to identify users that accessed media for which the AME 102 is interested in generating audience measurement metrics. The example Bloom filter array generator 1010 generates modulo 2 Bloom filter arrays based on the Bloom filter parameters and the user information associated with users identified by the user data analyzer 1008 to be included in the filter. An example process to generate a modulo 2 Bloom filter array is detailed below in connection with FIG. 12.

The example noise generator 1012 adds noise to the Bloom filter arrays generated by the Bloom filter array generator 1010. Due to the modulo 2 addition used when generating the Bloom filter arrays, the noise generator 1012 may add noise to the Bloom filter array before or after the Bloom filter array generator 1010 allocates users to the different elements in the Bloom filter array.

While an example manner of implementing the database proprietor apparatus 1000 is illustrated in FIG. 10, one or more of the elements, processes and/or devices illustrated in FIG. 10 may be combined, divided, re-arranged, omitted, eliminated and/or implemented in any other way. Further, the example user database 1002, the example communications interface 1004, the example Bloom filter parameter database 1006, the example Bloom filter array generator 1010, the example user data analyzer 1008, the example noise generator 1012 and/or, more generally, the example database proprietor apparatus 1000 of FIG. 3 may be implemented by hardware, software, firmware and/or any combination of hardware, software and/or firmware. Thus, for example, any of the example user database 1002, the example communications interface 1004, the example Bloom filter parameter database 1006, the example user data analyzer 1008, the example Bloom filter array generator 1010, the example noise generator 1012 and/or, more generally, the example database proprietor apparatus 1000 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user database 1002, the example communications interface 1004, the example Bloom filter parameter database 1006, the example user data analyzer 1008, the example Bloom filter array generator 1010, and/or the example noise generator 1012 is/are hereby expressly defined to include a non-transitory computer readable storage device or storage disk such as a memory, a digital versatile disk (DVD), a compact disk (CD), a Blu-ray disk, etc. including the software and/or firmware. Further still, the example database proprietor apparatus 1000 may include one or more elements, processes and/or devices in addition to, or instead of, those illustrated in FIG. 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
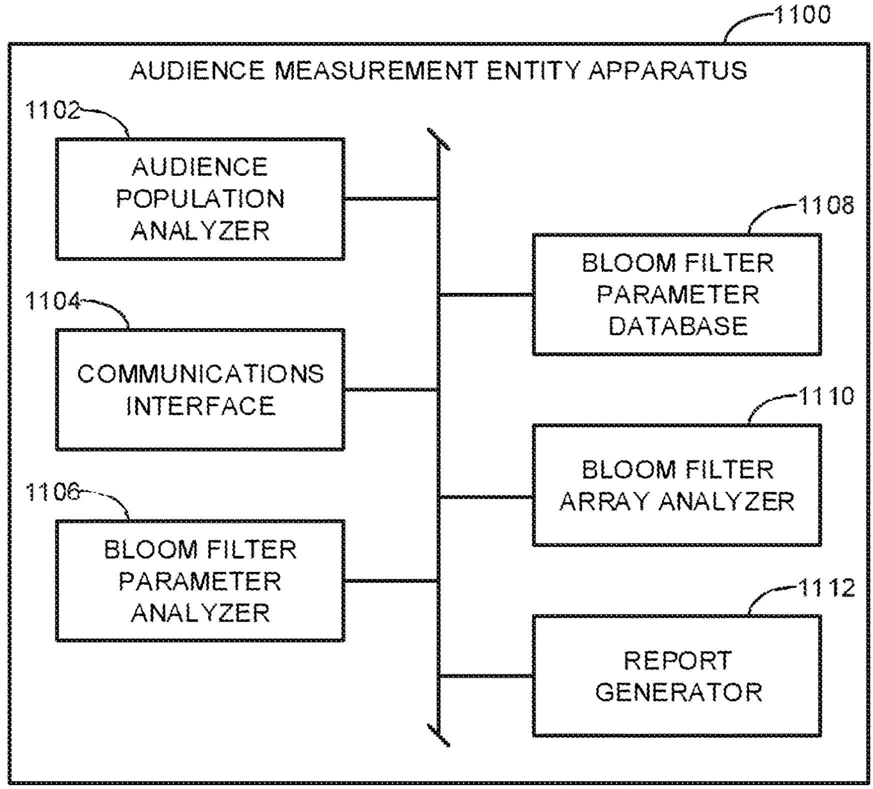
FIG. 11 is a block diagram of an audience measurement entity apparatus of the audience measurement entity of FIG. 1.

FIG. 11 is a block diagram of an AME apparatus 1100 of the AME 102 of FIG. 1. The example AME 102 includes an example audience population analyzer 1102, an example communications interface 1104, an example Bloom filter parameter analyzer 1106, an example Bloom filter parameter database 1108, an example Bloom filter array analyzer 1110, and an example report generator 1112.

The example audience population analyzer 1102 determines a universe estimate for the size of population that may potentially be reached by a particular media based on the geographic region where the media is distributed, the platforms through which the media is distributed, and/or any other suitable factor(s). The example communications interface 1104 enables the AME apparatus 1100 to communicate with the database proprietors 106*a-b*.

The example Bloom filter parameter analyzer 1106 determines suitable parameters for Bloom filter arrays based on the universe estimate of the audience population analyzer 1102. More particularly, in some examples, the length of a Bloom filter array is determined based on a maximum expected number of users in an underlying dataset to be represented in the Bloom filter array. In some examples, the expected number of users is determined based on the universe estimate. Further, the example Bloom filter parameter analyzer 1106 determines parameters defining the hash function(s) used to evaluate PII data associated with particular users to be represented in the Bloom filter array. Further still, in some examples, the Bloom filter parameter analyzer 1106 determines parameters defining how outputs of the hash functions map to particular bits or elements of the Bloom filter array. In some examples, the parameters defining the hash function(s) and length of the Bloom filter array are stored in the Bloom filter parameter database 1108 along with other Bloom filter parameters (e.g., noise parameters). In some examples, the Bloom filter parameters stored in the database 1108 may be provided to the database proprietors 106*a-b* via the example communications interface 1104. In some examples, the noise parameters (and/or other Bloom filter parameters) may be provided by the database proprietors 106*a-b* and received via the communications interface 1104.

The example Bloom filter array analyzer 1110 analyzes Bloom filter arrays obtained from the database proprietors 106*a-b* to estimate the cardinality or total number of unique users represented in individual ones of the Bloom filter arrays and/or across the union of multiple such Bloom filter arrays. Further, in some examples, the Bloom filter array analyzer 1110 estimates cardinalities for any Boolean combination of an intersection between different ones of the multiple Bloom filter arrays. An example process to estimate the cardinality of users across multiple Bloom filter arrays is provided below in connection with FIG. 13.

The example report generator 1112 generates any suitable report conveying audience measurement information and estimates. In some examples, where the Bloom filter arrays correspond to the exposure to an advertisement in an advertising campaign, the report generated by the report generator 1112 includes an indication of reach of the advertising campaign. That is, the report includes an indication of the total number of unique individuals that were exposed to the advertisement during a relevant period of time. In some examples, the total number of unique individuals corresponds to the cardinality estimate for a unioned set of Bloom filter arrays as described above.

While an example manner of implementing the AME apparatus 1100 is illustrated in FIG. 11, one or more of the elements, processes and/or devices illustrated in FIG. 11 may be combined, divided, re-arranged, omitted, eliminated and/or implemented in any other way. Further, the example audience population analyzer 1102, the example communications interface 1104, the example Bloom filter parameter analyzer 1106, the example Bloom filter parameter database 1108, the example Bloom filter array analyzer 1110, the example report generator 1112 and/or, more generally, the example AME apparatus 1100 of FIG. 11 may be implemented by hardware, software, firmware and/or any combination of hardware, software and/or firmware. Thus, for example, any of the example audience population analyzer 1102, the example communications interface 1104, the example Bloom filter parameter analyzer 1106, the example Bloom filter parameter database 1108, the example Bloom filter array analyzer 1110, the example report generator 1112 and/or, more generally, the example AME apparatus 1100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audience population analyzer 1102, the example communications interface 1104, the example Bloom filter parameter analyzer 1106, the example Bloom filter parameter database 1108, the example Bloom filter array analyzer 1110, and/or the example report generator 1112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AME apparatus 1100 may include one or more elements, processes and/or devices in addition to, or instead of, those illustrated in FIG. 11, and/or may include more than one of any or all of the illustrated elements, processes and devices.

Figure 12:
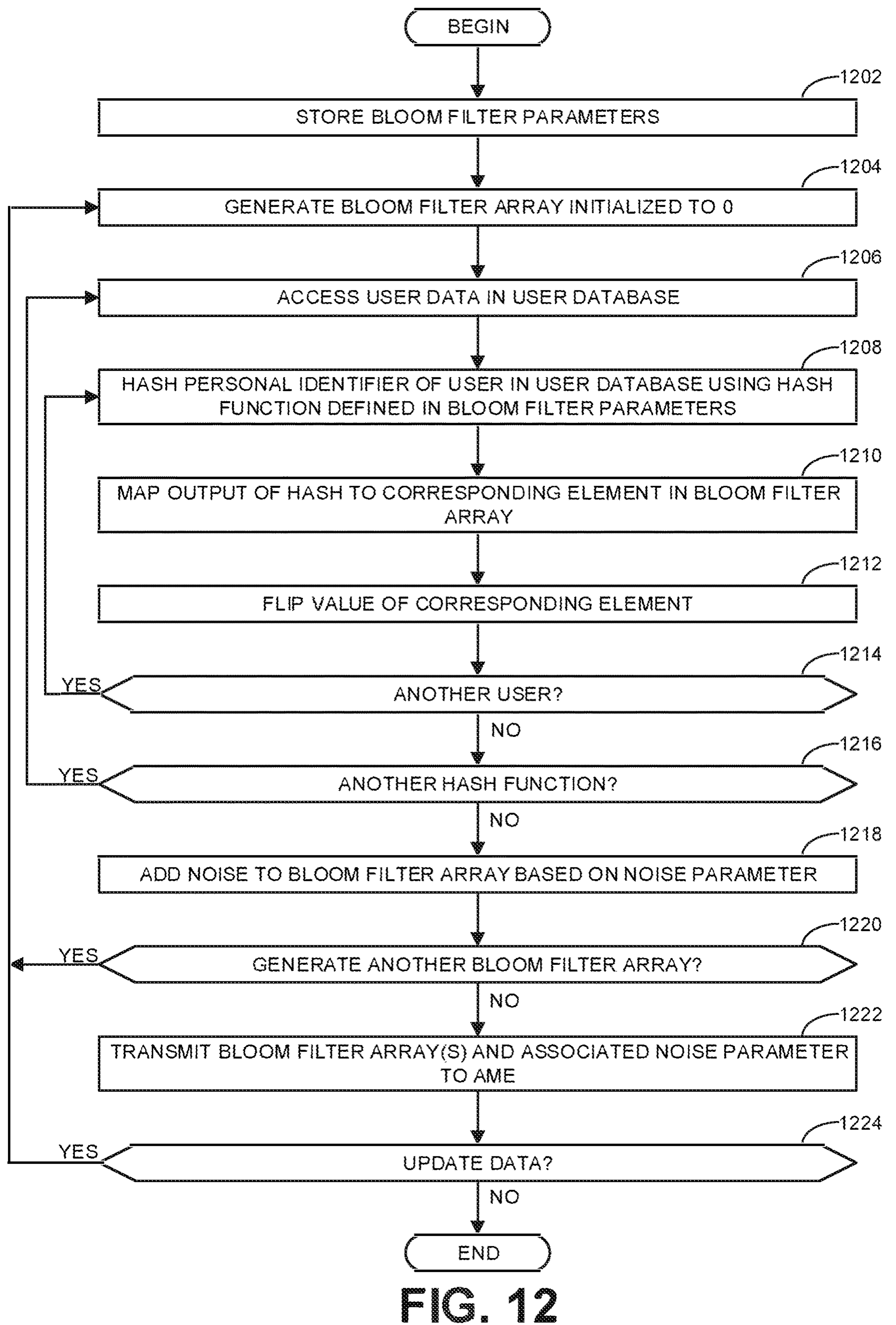
FIG. 12 is a flowchart representative of example machine readable instructions that may be executed to implement the example database proprietor apparatus of FIG. 10.
Figures 13, 15:
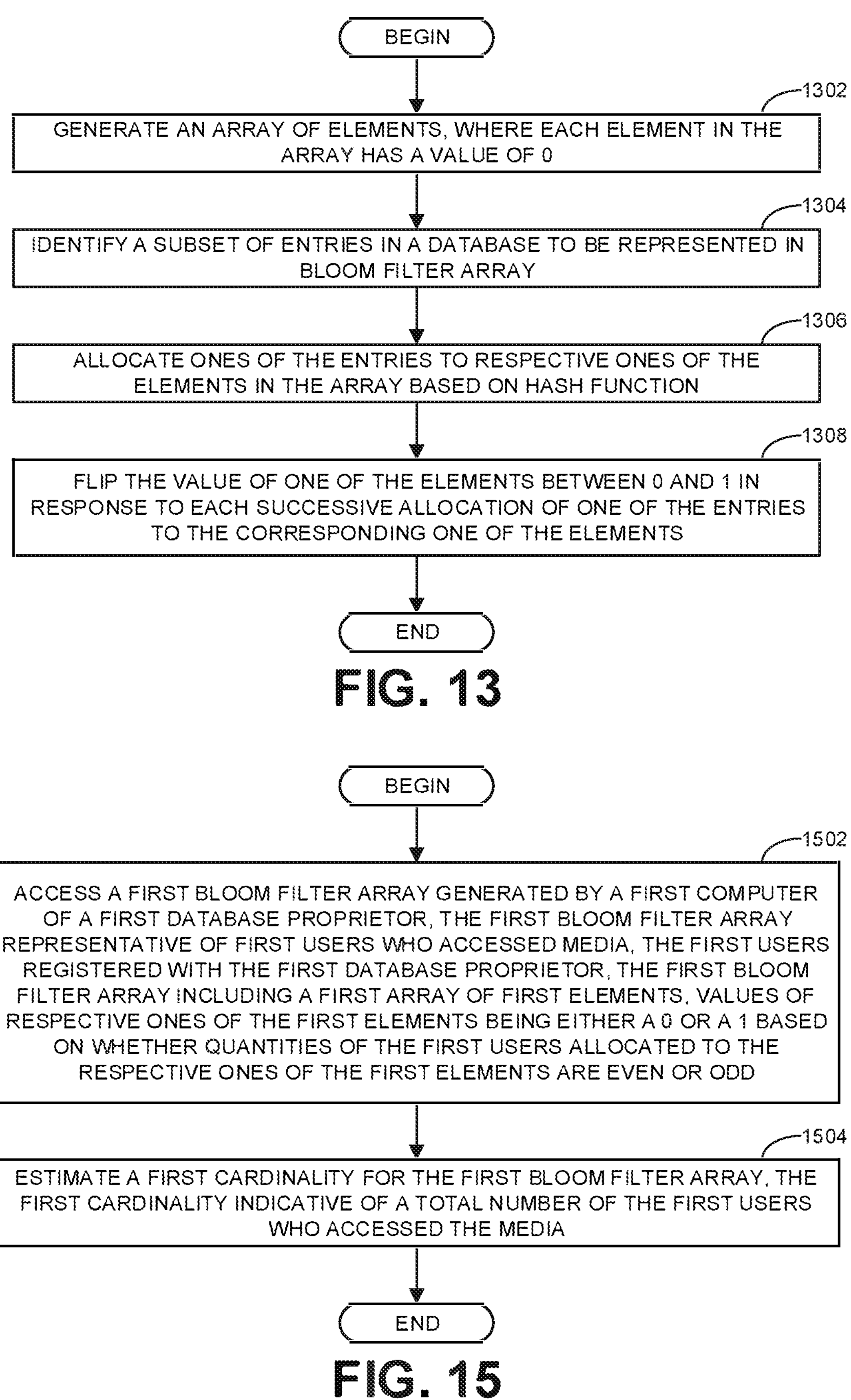
FIG. 13 is a flowchart representative of example machine readable instructions that may be executed to implement the example database proprietor apparatus of FIG. 10.
FIG. 15 is a flowchart representative of example machine readable instructions that may be executed to implement the example audience measurement entity apparatus of FIG. 11.

Flowcharts representative of example hardware logic, machine readable instructions, hardware implemented state machines, and/or any combination thereof for implementing the database proprietor apparatus 1000 of FIG. 10 are shown in FIGS. 12 and 13. The machine readable instructions may be one or more executable programs or portion(s) of an executable program for execution by a computer processor and/or processor circuitry, such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example programs are described with reference to the flowcharts illustrated in FIGS. 12 and 13, many other methods of implementing the example database proprietor apparatus 1000 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 14:
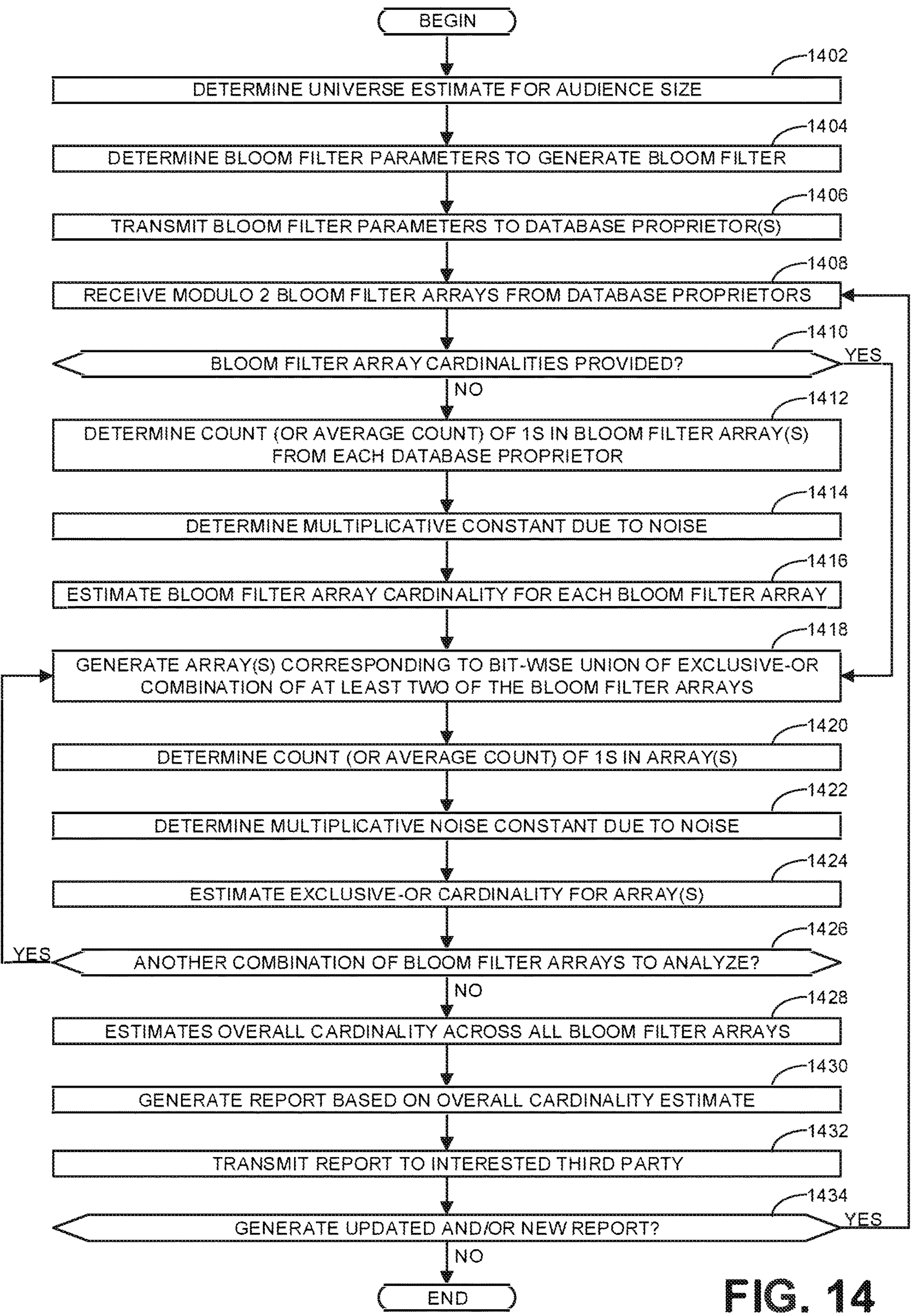
FIG. 14 is a flowchart representative of example machine readable instructions that may be executed to implement the example audience measurement entity apparatus of FIG. 11.

Flowcharts representative of example hardware logic, machine readable instructions, hardware implemented state machines, and/or any combination thereof for implementing the AME apparatus 1100 of FIG. 11 is shown in FIGS. 14 and 15. The machine readable instructions may be one or more executable programs or portion(s) of an executable program for execution by a computer processor and/or processor circuitry, such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example programs are described with reference to the flowcharts illustrated in FIGS. 14 and 15, many other methods of implementing the example AME apparatus 1100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 12-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

In some examples, the program of FIG. 12 is independently implemented by each database proprietor 106*a-b* that is to provide a Bloom filter array to the AME 102 in connection with a particular item of media for which exposure metrics are desired. The program of FIG. 12 begins at block 1202 where the example Bloom filter parameter database 1006 stores Bloom filter parameter(s) to generate a modulo 2 Bloom filter array. At block 1204, the example Bloom filter array generator 1010 generates a Bloom filter array initialized to 0. In some examples, the length of the Bloom filter array is defined by and/or agreed upon between the AME 102 and each database proprietor 106*a-b* that is to generate a Bloom filter array based on the example process of FIG. 12. At block 1206, the example user data analyzer 1008 accesses user data in the user database 1002. At block 1208, the example Bloom filter array generator 1010 hashes a personal identifier in the user database 1002 using a hash function defined in the Bloom filter parameters. At block 1210, the example Bloom filter array generator 1010 maps an output of the hash to a corresponding element in the Bloom filter array. At block 1212, the example Bloom filter array generator 1010 flips the value of the corresponding element. That is, if the value was previously 1, the Bloom filter array generator 1010 sets the value to 0, and if the value was previously 0, the Bloom filter array generator 1010 sets the value to 1.

At block 1214, the example Bloom filter array generator 1010 determines whether there is another user. If so, control returns to block 1208. If not, control advances to block 1216 where the example Bloom filter array generator 1010 determines whether there is another hash function. If so, control returns to block 1206. Otherwise, control advances to block 1218 where the example noise generator 1012 adds noise to the Bloom filter array based on a noise parameter. In some examples, noise may be unnecessary due to the nature of the modulo 2 flipping of element values at block 1212 such that block 1218 is omitted. At block 1220, the example Bloom filter array generator 1010 determines whether to generate another Bloom filter array. In some examples, multiple Bloom filter arrays may be generated for the same underlying dataset to form a group of Bloom filter arrays of shorter length rather than a single Bloom filter array of longer length. If another Bloom filter array is to be generated for the same data, control returns to block 1204 to repeat the process. However, during each subsequent iteration of the process (e.g., to generate a different Bloom filter array), different hash functions are used at block 1208 so that the allocation of users to elements in each Bloom filter array in the group will be different. If, at block 1220, the example Bloom filter array generator 1010 determines not to generate another Bloom filter array, control advances to block 1222.

At block 1222, the example communications interface 1004 transmits the Bloom filter array(s) and the associated noise parameter to the AME 102. Of course, if no noise was added, the noise parameter may be omitted. However, in some examples, a noise parameter with a value of 0 may be provided to indicate that no noise was added to the Bloom filter array. In some examples, the communications interface 1004 may also transmit a Bloom filter array cardinality for each Bloom filter array in the group (or single Bloom filter array) transmitted to the AME to indicate the total number of users represented in the associated Bloom filter array(s). At block 1224, the example Bloom filter array generator 1010 determines whether to update the data. In some examples, data is updated on a relatively frequent basis (e.g., once a week, once a day, etc.). If the data is to be updated, control returns to block 1204 to repeat the process. Otherwise, the example process of FIG. 12 ends.

In some examples, the program of FIG. 13 is independently implemented by each database proprietor 106*a-b* that is to provide a Bloom filter array to the AME 102 in connection with a particular item of media for which exposure metrics are desired. The program of FIG. 13 begins at block 1302 where the example Bloom filter array generator 1010 generates an array of elements, where each element in the array has a value of 0. At block 1304, the example user data analyzer 1008 identifies a subset of entries in a database (e.g., the user database 1002) to be represented in the Bloom filter array. At block 1306, the example Bloom filter array generator 1010 allocates ones of the entries to respective ones of the elements in the array based on a hash function. At block 1308, the example Bloom filter array generator 1010 flips the of one of the elements between 0 and 1 in response to each successive allocation of one of the entries to the corresponding one of the elements. That is, if the value was previously 1, the Bloom filter array generator 1010 sets the value to 0, and if the value was previously 0, the Bloom filter array generator 1010 sets the value to 1. Thereafter, the example process of FIG. 13 ends.

The program of FIG. 14 begins at block 1402 where the example audience population analyzer 1102 determines a universe estimate for an audience size. At block 1404, the example Bloom filter parameter analyzer 1106 determines Bloom filter parameters to generate a Bloom filter array. At block 1406, the example communications interface 1104 transmits the Bloom filter parameters to the database proprietors 106*a-b*. At block 1408, the example communications interface 1104 receives modulo 2 Bloom filter arrays from the database proprietors 106*a-b*. In some examples, along with the Bloom filter arrays, the database proprietors 106*a-b* may provide a noise parameter defining the probability at which noise was added to the respective Bloom filter arrays. Further, in some examples, the database proprietors 106*a-b* may also provide a Bloom filter array cardinality indicating the total number of unique users represented in the respective Bloom filter arrays.

At block 1410, the example Bloom filter array analyzer 1110 determines whether Bloom filter array cardinalities were provided. If so, control advances to block 1418. If not, then the example Bloom filter array analyzer 1110 needs to determine the Bloom filter array cardinalities. Accordingly, control advances to block 1412 where the example Bloom filter array analyzer 1110 determines a count (or average count) of is in the Bloom filter array(s) from each database. If each database proprietor 106*a-b* provided only one Bloom filter array, then a simple count of the is in that Bloom filter array is sufficient. However, if the database proprietors 106*a-b* provided a group of multiple Bloom filter arrays, then the example Bloom filter array analyzer 1110 determines the count of is in each Bloom filter array and then determines the average of the count for the corresponding group of Bloom filter arrays.

At block 1414, the example Bloom filter array analyzer 1110 determines a multiplicative constant ($d_{\{i\}}$) due to noise for the Bloom filter array. In some examples, the multiplicative constant is determined by evaluating Equation 39, where $p_j$ corresponds to the noise parameter provided by the database proprietor 106*a-b*. In examples where there is no noise, the noise parameter equals 0 such that the multiplicative constant equals 1. In some examples, where there is no noise, block 1414 may be omitted. At block 1416, the example Bloom filter array analyzer 1110 estimates a Bloom filter array cardinality for each of the Bloom filter arrays. In some examples, the Bloom filter array cardinality is estimated by evaluating Equation 40 and using the count (or average count) of is (determined at block 1412) as the value for $c_1$. In some examples, where there is no noise, the Bloom filter array cardinality may be estimated by evaluating Equation 9, which is similar to Equation 40 except that there is no multiplicative constant to account for the noise in Equation 9.

At block 1418, the example Bloom filter array analyzer 1110 generates one or more array(s) corresponding to a bit-wise union of an exclusive-or combination of at least two of the Bloom filter arrays. Multiple arrays are generated for the same exclusive-or combination when a group of multiple Bloom filter arrays are provided by the database proprietors 106*a-b*. In some examples, the bit wise union is implemented based on modulo 2 addition as shown and described in connection with Equation 12. After the array(s) for a particular combination of the Bloom filter arrays has been generated, the example Bloom filter array analyzer 1110 determines the exclusive-or cardinality for the array(s) following a similar process to determine the Bloom filter array cardinalities described above at blocks 1412-1316. That is, at block 1420, the example Bloom filter array analyzer 1110 determines a count (or average count) of is in the array(s). At block 1422, the example Bloom filter array analyzer 1110 determines a multiplicative constant due to noise. In some examples, block 1422 may be omitted because the multiplicative constant was already determined at block 1414. At block 1424, the example Bloom filter array analyzer 1110 estimates the exclusive-or cardinality for the array(s).

At block 1426, the example Bloom filter array analyzer 1110 determines whether there is another combination of Bloom filter arrays to analyze. As described above, every combination of the Bloom filter arrays including taking them 1 at time, 2 at a time, up to taking all of them together is analyzed. The analysis of each of the Bloom filter arrays individual (e.g., taken 1 at a time) is accomplished at blocks 1410-1316 such that the determination at block 1426 relates to combinations of two or more Bloom filter arrays. If the example Bloom filter array analyzer 1110 determines that there is another combination of Bloom filter arrays to analyze, control returns to block 1418. Otherwise, control advances to block 1428.

At block 1428, the example Bloom filter array analyzer 1110 estimates the overall cardinality across all the Bloom filter arrays. In some examples, the overall cardinality is estimated by evaluating Equation 20, which involves summing each of the Bloom filter array cardinalities and each of the exclusive-or cardinalities, and then dividing the total by a constant. At block 1430, the example report generator 1112 generates a report based on the overall cardinality estimate. At block 1432, the example communications interface 1104 transmits the report to an interested third party. At block 1434, the example report generator 1112 determines whether to generate an updated and/or new report. As mentioned above, in some examples, reports are generated on a relatively frequent basis (e.g., weekly, daily, etc.). If an updated and/or new report is to be generated, control returns to block 1408. Otherwise, the example program of FIG. 14 ends.

The example program of FIG. 15 begins at block 1502 where the example communications interface 1104 accesses and/or receives a first Bloom filter array generated by a first computer of a first database proprietor, where the first Bloom filter array is representative of first users who accessed media, the first users is registered with the first database proprietor, the first Bloom filter array includes a first array of first elements, and values of respective ones of the first elements are either a 0 or a 1 based on whether quantities of the first users allocated to the respective ones of the first elements are even or odd. At block 1504, the example Bloom filter analyzer 1110 estimates a first cardinality for the first Bloom filter array, where the first cardinality indicative of a total number of the first users who accessed the media. Thereafter, the example process of FIG. 15 ends.

Figure 16:
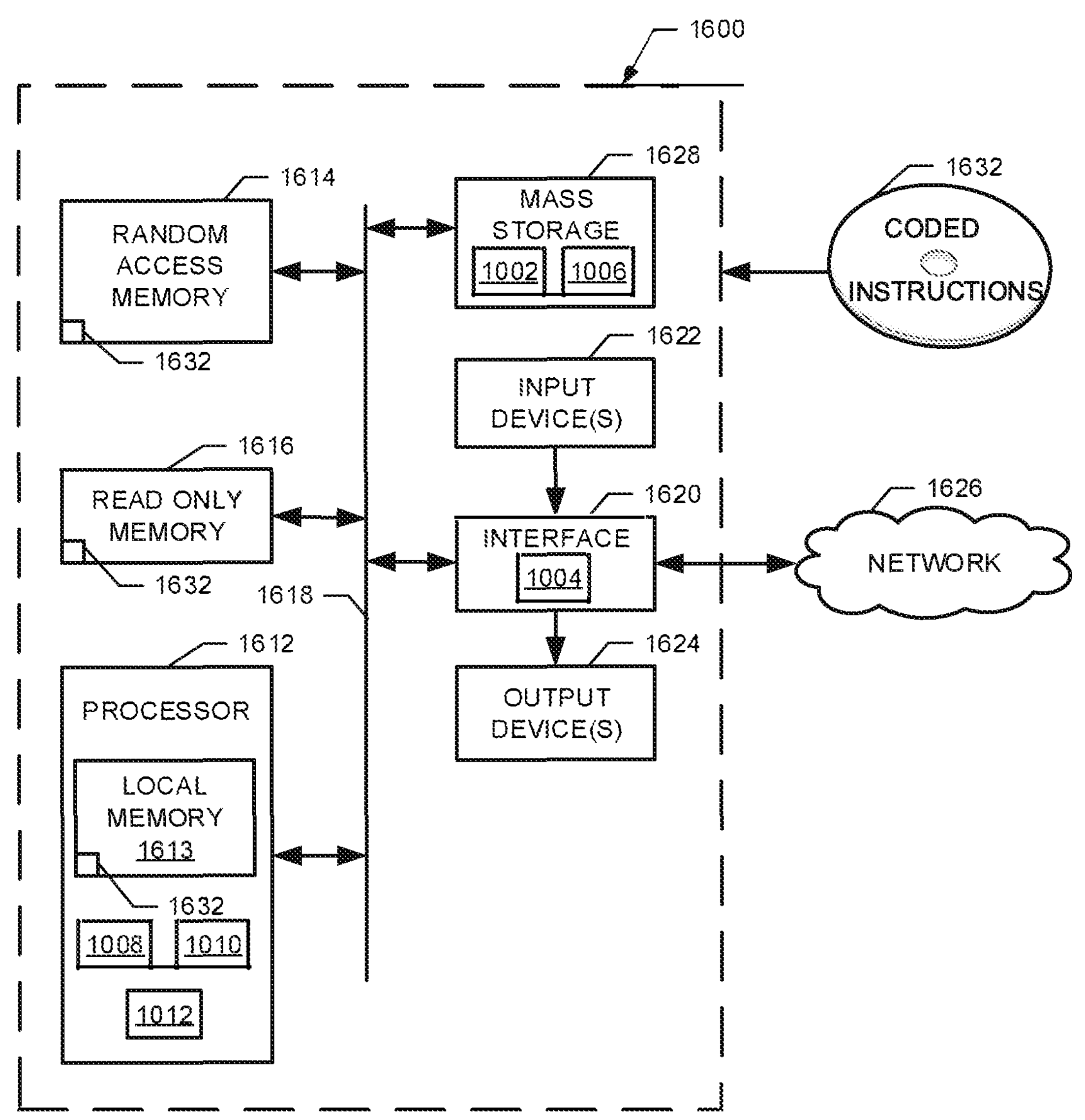
FIG. 16 is a block diagram of an example processing platform structured to execute the example instructions of FIGS. 12 and/or 13 to implement the example database proprietor apparatus of FIG. 10.

FIG. 16 is a block diagram of an example processor platform 1600 structured to execute the instructions of FIG. 12 to implement the database proprietor apparatus 1000 of FIG. 10. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user data analyzer 1008, the example Bloom filter array generator 1010 and the example noise generator 1012.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. In this example, the interface circuit 1620 implements the example communications interface 1004. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives. In this example, the mass storage devices 1628 implement the example user database 1002 and the example Bloom filter parameter database 1006.

The machine executable instructions 1632 of FIG. 12 may be stored in the mass storage device 1628, in the volatile memory 1614, in the non-volatile memory 1616, and/or on a removable non-transitory computer readable storage medium such as a CD or DVD.

Figure 17:
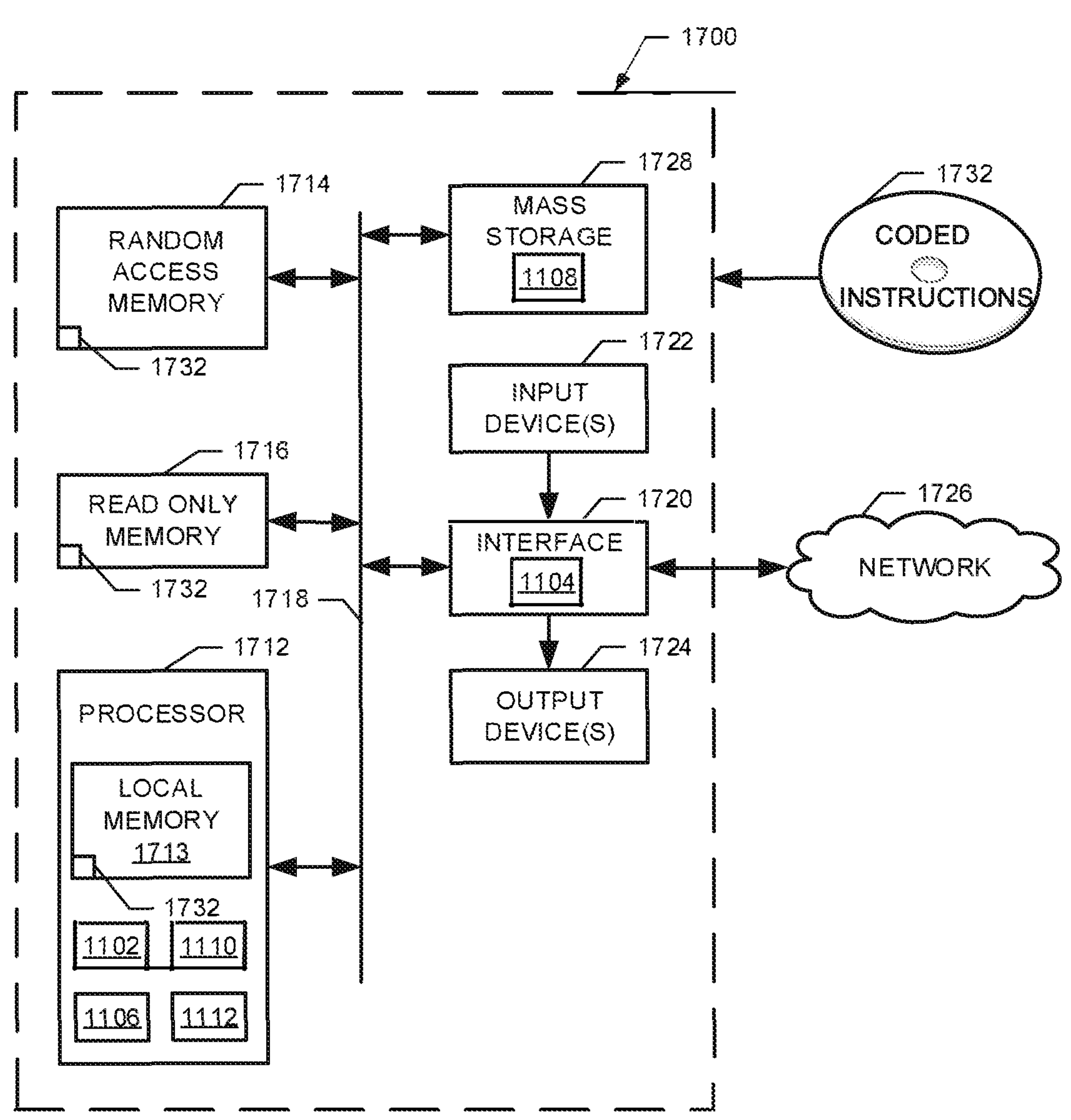
FIG. 17 is a block diagram of an example processing platform structured to execute the example instructions of FIGS. 14 and/or 15 to implement the example audience measurement entity apparatus of FIG. 11.

FIG. 17 is a block diagram of an example processor platform 1700 structured to execute the instructions of FIG. 14 to implement the AME apparatus 1100 of FIG. 11. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audience population analyzer 1102, the example Bloom filter parameter analyzer 1106, the example Bloom filter array analyzer 1110, and the example report generator 1112.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. In this example, the interface circuit 1720 implements the example communications interface 1104. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives. In this example, the mass storage devices 1728 implements the example Bloom filter parameter database 1108.

The machine executable instructions 1732 of FIG. 14 may be stored in the mass storage device 1728, in the volatile memory 1714, in the non-volatile memory 1716, and/or on a removable non-transitory computer readable storage medium such as a CD or DVD.

From the foregoing, it will be appreciated that example methods, apparatus and articles of manufacture have been disclosed that enable the generation of a modulo 2 Bloom filter array that provides increased privacy relative to traditional Bloom filter arrays because of the repeating flipping between 0s and 1s. Furthermore, the flipping between 0s to is and from is back to 0s reduces the concern for saturation (substantially all elements becoming 1s) such that the length of modulo 2 Bloom filter arrays described herein may have a shorter length than traditional Bloom filter arrays. The shorter length of Bloom filter array results in the need for less memory space and for more efficient processing. Thus, the disclosed methods, apparatus and articles of manufacture are accordingly directed to one or more improvement(s) in the functioning of a computer. Furthermore, in addition to providing increased privacy protection and reducing memory and processing requirements, the modulo 2 Bloom filter arrays may also be used to estimate the cardinality indicative of the number of users within an underlying dataset of a Bloom filter array as well as the overall cardinality across the union of multiple Bloom filter arrays. This is particularly advantageous in the technical field of audience measurement of online media where some database proprietors are no longer supporting third-party cookies such that audience measurement entities can no longer track exposure to media directly, but must rely on reports from the database proprietors in the form of sketch data (such as Bloom filter arrays as disclosed herein) that preserves the privacy of their users.

Example 1 includes an apparatus comprising a communications interface to receive a first Bloom filter array from a first computer of a first database proprietor, the first Bloom filter array representative of first users who accessed media, the first users registered with the first database proprietor, the first Bloom filter array including a first array of first elements, values of respective ones of the first elements being either a 0 or a 1 based on whether quantities of the first users allocated to the respective ones of the first elements are even or odd, and a Bloom filter array analyzer to estimate a first cardinality for the first Bloom filter array, the first cardinality indicative of a total number of the first users who accessed the media.

Example 2 includes the apparatus of example 1, wherein the Bloom filter array analyzer is to determine a count of the first elements with a value of 1, and estimate the first cardinality based on the count.

Example 3 includes the apparatus of example 2, wherein the count is a first count, the communications interface to receive a second Bloom filter array from the first computer of the first database proprietor, the second Bloom filter array representative of the first users who accessed media, the second Bloom filter array including a second array of second elements, the first users allocated to ones of the first elements of the first array based on a first hash function and allocated to ones of the second elements of the second array based on a second hash function different than the first has function, the Bloom filter array analyzer to determine a second count of the second elements with a value of 1, and estimate the first cardinality based on an average of the first and second counts.

Example 4 includes the apparatus of any one of examples 1-3, wherein the Bloom filter array analyzer is to determine a multiplicative constant based on a noise parameter, the noise parameter defining a probability at which ones of the values of respective ones of the first elements are flipped between 0 and 1 independent of an allocation of the first users to the respective ones of the first elements, and estimate the first cardinality based on the multiplicative constant.

Example 5 includes the apparatus of any one of examples 1-4, wherein the communications interface is to receive a second Bloom filter array from a second computer of a second database proprietor, the second Bloom filter array representative of second users who accessed the media, the second users registered with the second database proprietor, the second Bloom filter array including a second array of second elements, values of respective ones of the second elements being either a 0 or a 1 based on whether quantities of the second users allocated to the respective ones of the second elements are even or odd, the Bloom filter array analyzer to estimate an overall cardinality across both the first and second Bloom filter arrays, the overall cardinality indicative of a total number of unique individuals corresponding to the first and second users who accessed the media.

Example 6 includes the apparatus of example 5, wherein the first array of first elements has a same length as the second array of second elements, the length corresponding to an odd number of elements.

Example 7 includes the apparatus of any one of examples 5 or 6, wherein the Bloom filter array analyzer is to generate a third array of third elements based on a bit-wise union of the first array and the second array, the bit-wise union based on modulo 2 addition, and estimate the overall cardinality based on the third array.

Example 8 includes the apparatus of any one of examples 1-7, wherein the communications interface is to receive a plurality of Bloom filter arrays including the first Bloom filter array, ones of the Bloom filter arrays representative of different users who accessed the media, the Bloom filter array analyzer to generate a plurality of arrays based on bit-wise unions between different sets of at least two of the plurality of Bloom filter arrays, the bit-wise unions based on modulo 2 addition, ones of the plurality of arrays representative of exclusive-or groupings of the different users included within datasets underlying respective ones of the plurality of Bloom filter arrays, estimate a plurality of exclusive-or cardinalities for the plurality of arrays, and estimate an overall cardinality across the plurality of Bloom filter arrays based on a summation of the exclusive-or cardinalities.

Example 9 includes a non-transitory computer readable medium comprising instructions that, when executed, cause a machine to at least access a first Bloom filter array generated by a first computer of a first database proprietor, the first Bloom filter array representative of first users who accessed media, the first users registered with the first database proprietor, the first Bloom filter array including a first array of first elements, values of respective ones of the first elements being either a 0 or a 1 based on whether quantities of the first users allocated to the respective ones of the first elements are even or odd, and estimate a first cardinality for the first Bloom filter array, the first cardinality indicative of a total number of the first users who accessed the media.

Example 10 includes the non-transitory computer readable medium of example 9, wherein the instructions further cause the machine to determine a count of the first elements with a value of 9, and estimate the first cardinality based on the count.

Example 11 includes the non-transitory computer readable medium of example 10, wherein the count is a first count, and the instructions further cause the machine to access a second Bloom filter array generated by the first computer of the first database proprietor, the second Bloom filter array representative of the first users who accessed media, the second Bloom filter array including a second array of second elements, the first users allocated to ones of the first elements of the first array based on a first hash function and allocated to ones of the second elements of the second array based on a second hash function different than the first has function, determine a second count of the second elements with a value of 1, and estimate the first cardinality based on an average of the first and second counts.

Example 12 includes the non-transitory computer readable medium of any one of examples 9-11, wherein the instructions further cause the machine to determine a multiplicative constant based on a noise parameter, the noise parameter defining a probability at which ones of the values of respective ones of the first elements are flipped between 0 and 1 independent of an allocation of the first users to the respective ones of the first elements, and estimate the first cardinality based on the multiplicative constant.

Example 13 includes the non-transitory computer readable medium of any one of examples 9-12, wherein the instructions further cause the machine to access a second Bloom filter array generated by a second computer of a second database proprietor, the second Bloom filter array representative of second users who accessed the media, the second users registered with the second database proprietor, the second Bloom filter array including a second array of second elements, values of respective ones of the second elements being either a 0 or a 1 based on whether quantities of the second users allocated to the respective ones of the second elements are even or odd, and estimate an overall cardinality across both the first and second Bloom filter arrays, the overall cardinality indicative of a total number of unique individuals corresponding to the first and second users who accessed the media.

Example 14 includes the non-transitory computer readable medium of example 13, wherein the first array of first elements has a same length as the second array of second elements, the length corresponding to an odd number of elements.

Example 15 includes the non-transitory computer readable medium of any one of examples 13 or 14, wherein the instructions further cause the machine to generate a third array of third elements based on a bit-wise union of the first array and the second array, the bit-wise union based on modulo 2 addition, and estimate the overall cardinality based on the third array.

Example 16 includes the non-transitory computer readable medium of any one of examples 9-15, wherein the instructions further cause the machine to access a plurality of Bloom filter arrays including the first Bloom filter array, ones of the Bloom filter arrays representative of different users who accessed the media, generate a plurality of arrays based on bit-wise unions between different sets of at least two of the plurality of Bloom filter arrays, the bit-wise unions based on modulo 2 addition, ones of the plurality of arrays representative of exclusive-or groupings of the different users included within datasets underlying respective ones of the plurality of Bloom filter arrays, estimate a plurality of exclusive-or cardinalities for the plurality of arrays, and estimate an overall cardinality across the plurality of Bloom filter arrays based on a summation of the exclusive-or cardinalities.

Example 17 includes a method comprising accessing a first Bloom filter array generated by a first computer of a first database proprietor, the first Bloom filter array representative of first users who accessed media, the first users registered with the first database proprietor, the first Bloom filter array including a first array of first elements, values of respective ones of the first elements being either a 0 or a 1 based on whether quantities of the first users allocated to the respective ones of the first elements are even or odd, and estimating, by executing an instruction with a processor, a first cardinality for the first Bloom filter array, the first cardinality indicative of a total number of the first users who accessed the media.

Example 18 includes the method of example 17, further including determining a count of the first elements with a value of 1, and estimating the first cardinality based on the count.

Example 19 includes the method of example 18, wherein the count is a first count, and further including accessing a second Bloom filter array generated by the first computer of the first database proprietor, the second Bloom filter array representative of the first users who accessed media, the second Bloom filter array including a second array of second elements, the first users allocated to ones of the first elements of the first array based on a first hash function and allocated to ones of the second elements of the second array based on a second hash function different than the first has function, determining a second count of the second elements with a value of 1, and estimating the first cardinality based on an average of the first and second counts.

Example 20 includes the method of any one of examples 17-19, further including determining a multiplicative constant based on a noise parameter, the noise parameter defining a probability at which ones of the values of respective ones of the first elements are flipped between 0 and 1 independent of an allocation of the first users to the respective ones of the first elements, and estimating the first cardinality based on the multiplicative constant.

Example 21 includes the method of any one of examples 17-20, further including accessing a second Bloom filter array generated by a second computer of a second database proprietor, the second Bloom filter array representative of second users who accessed the media, the second users registered with the second database proprietor, the second Bloom filter array including a second array of second elements, values of respective ones of the second elements being either a 0 or a 1 based on whether quantities of the second users allocated to the respective ones of the second elements are even or odd, and estimating an overall cardinality across both the first and second Bloom filter arrays, the overall cardinality indicative of a total number of unique individuals corresponding to the first and second users who accessed the media.

Example 22 includes the method of example 21, wherein the first array of first elements has a same length as the second array of second elements, the length corresponding to an odd number of elements.

Example 23 includes the method of any one of examples 21 or 22, further including generating a third array of third elements based on a bit-wise union of the first array and the second array, the bit-wise union based on modulo 2 addition, and estimating the overall cardinality based on the third array.

Example 24 includes the method of any one of examples 17-23, further including accessing a plurality of Bloom filter arrays including the first Bloom filter array, ones of the Bloom filter arrays representative of different users who accessed the media, generating a plurality of arrays based on bit-wise unions between different sets of at least two of the plurality of Bloom filter arrays, the bit-wise unions based on modulo 2 addition, ones of the plurality of arrays representative of exclusive-or groupings of the different users included within datasets underlying respective ones of the plurality of Bloom filter arrays, estimating a plurality of exclusive-or cardinalities for the plurality of arrays, and estimating an overall cardinality across the plurality of Bloom filter arrays based on a summation of the exclusive-or cardinalities.

Example 25 includes an apparatus to generate a modulo 2 Bloom filter array, the method comprising a data analyzer to identify a subset of entries in a database to be represented in the Bloom filter array, and a Bloom filter array generator to generate an array of elements, each element in the array having a value of 0, allocate ones of the entries to respective ones of the elements in the array based on a hash function, and flip the value of a first one of the elements between 0 and 1 in response to each successive allocation of one of the entries to the first one of the elements.

Example 26 includes a non-transitory computer readable medium comprising instructions that, when executed, cause a machine to at least identify a subset of entries in a database to be represented in the Bloom filter array, generate an array of elements, each element in the array having a value of 0, allocate ones of the entries to respective ones of the elements in the array based on a hash function, and flip the value of a first one of the elements between 0 and 1 in response to each successive allocation of one of the entries to the first one of the elements.

Example 27 includes a method to generate a modulo 2 Bloom filter array, the method comprising generating, by executing an instruction with a processor, an array of elements, each element in the array having a value of 0, identifying, by executing an instruction with the processor, a subset of entries in a database to be represented in the Bloom filter array, allocating, by executing an instruction with the processor, ones of the entries to respective ones of the elements in the array based on a hash function, and flipping, by executing an instruction with the processor, the value of a first one of the elements between 0 and 1 in response to each successive allocation of one of the entries to the first one of the elements.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising a processor, a memory, and a network communication interface, the computing system configured to perform a set of acts to generate a modulo 2 Bloom filter array, the set of acts comprising:

receiving network-based impression requests indicative of accesses to digital media over the internet by respective client devices, wherein the respective client devices are operated by respective users that are registered with a database proprietor;

based on receiving the network-based impression requests, logging media impressions in a database of the database proprietor;

obtaining, using the logged media impressions, a list of users that accessed the media;

generating an array of elements, each element in the array of the elements storing a same binary value;

allocating users of the list of users to respective ones of the elements in the array of the elements using a hash function, wherein allocating a user of the list of users to a respective element in the array comprises toggling a current binary value stored in the respective element in the array regardless of whether or not the current binary value stored in the respective element in the array has already been toggled; and after allocating the users of the list of users to the respective ones of the elements in the array, transmitting the array of elements to another computing system using the network communication interface, the transmitting to facilitate deduplication between the list of users who accessed the media and another list of users who accessed the media via bit-wise modulo 2 addition of the array of elements and another array of elements corresponding to the other list of users.

2. The computing system of claim 1, wherein:

the hash function allocates multiples users of the list of users to a first element in the array, and allocating the multiple users of the list of users to a first element in the array comprises:

flipping the binary value stored in the first element from a first binary value to a second binary value based on allocating a first user of the multiple users to the first element; and flipping the binary value stored in the first element from the second binary value to the first binary value based on allocating a second user of the multiple users to the first element.

3. The computing system of claim 1, wherein the other computing system is a computing system of an audience measurement entity.

4. The computing system of claim 1, wherein the set of acts further comprises receiving a network communication including filter parameters, the filter parameters defining the hash function and other proprieties of the array of elements.

5. The computing system of claim 1, wherein the network-based impressions requests include respective first-party cookies.

6. The computing system of claim 1, wherein the set of acts further comprises adding noise to the array of elements before transmitting the array of elements.

7. A method for generating a modulo 2 Bloom filter array, the method comprising:

receiving network-based impression requests indicative of accesses to digital media over the internet by respective client devices, wherein the respective client devices are operated by respective users that are registered with a database proprietor;

based on receiving the network-based impression requests, logging media impressions in a database of the database proprietor;

obtaining, by a computing system comprising a processor, a memory, and a network communication interface using the logged media impressions, a list of users that accessed the media;

generating, by the computing system, an array of elements, each element in the array of the elements storing a same binary value;

allocating, by the computing system, users of the list of users to respective ones of the elements in the array of the elements using a hash function, wherein allocating a user of the list of users to a respective element in the array comprises toggling a current binary value stored in the respective element in the array regardless of whether or not the current binary value stored in the respective element in the array has already been toggled; and after allocating the users of the list of users to the respective ones of the elements in the array, transmitting, by the computing system, the array of elements to another computing system using the network communication interface, the transmitting to facilitate deduplication between the list of users who accessed the media and another list of users who accessed the media via bit-wise modulo 2 addition of the array of elements and another array of elements corresponding to the other list of users.

8. The method of claim 7, wherein:

the hash function allocates multiples users of the list of users to a first element in the array, and allocating the multiple users of the list of users to a first element in the array comprises:

flipping the binary value stored in the first element from a first binary value to a second binary value based on allocating a first user of the multiple users to the first element; and flipping the binary value stored in the first element from the second binary value to the first binary value based on allocating a second user of the multiple users to the first element.

9. The method of claim 7, wherein the other computing system is a computing system of an audience measurement entity.

10. The method of claim 7, further comprising receiving a network communication including filter parameters, the filter parameters defining the hash function and other proprieties of the array of elements.

11. The method of claim 7, wherein the network-based impression requests include respective first-party cookies.

12. The method of claim 7, further comprising adding noise to the array of elements before transmitting the array of elements.

13. A non-transitory computer-readable medium having stored therein instructions that when executed by a computing system cause the computing system to perform a set of acts to generate a modulo 2 Bloom filter array, the set of acts comprising:

receiving network-based impression requests indicative of accesses to digital media over the internet by respective client devices, wherein the respective client devices are operated by respective users that are registered with a database proprietor;

based on receiving the network-based impression requests, logging media impressions in a database of the database proprietor;

obtaining, using the logged media impressions, a list of users that accessed the media;

generating an array of elements, each element in the array of the elements storing a same binary value;

allocating users of the list of users to respective ones of the elements in the array of the elements using a hash function, wherein allocating a user of the list of users to a respective element in the array comprises toggling a current binary value stored in the respective element in the array regardless of whether or not the current binary value stored in the respective element in the array has already been toggled; and after allocating the users of the list of users to the respective ones of the elements in the array, transmitting the array of elements to another computing system using a network communication interface, the transmitting to facilitate deduplication between the list of users who accessed the media and another list of users who accessed the media via bit-wise modulo 2 addition of the array of elements and another array of elements corresponding to the other list of users.

14. The non-transitory computer-readable medium of claim 13, wherein:

the hash function allocates multiples users of the list of users to a first element in the array, and allocating the multiple users of the list of users to a first element in the array comprises:

flipping the binary value stored in the first element from a first binary value to a second binary value based on allocating a first user of the multiple users to the first element; and flipping the binary value stored in the first element from the second binary value to the first binary value based on allocating a second user of the multiple users to the first element.

15. The non-transitory computer-readable medium of claim 13, wherein the other computing system is a computing system of an audience measurement entity.

16. The non-transitory computer-readable medium of claim 13, wherein the set of acts further comprises receiving a network communication including filter parameters, the filter parameters defining the hash function and other proprieties of the array of elements.

17. The non-transitory computer-readable medium of claim 13, wherein the network-based impression requests include respective first-party cookies.

* * * * *